United States Patent [19]
Cyrus et al.

[11] Patent Number: 5,924,905
[45] Date of Patent: Jul. 20, 1999

[54] MODULAR TERRAIN FOR A TOY BUILDING SET

[75] Inventors: Peter Cyrus; Steve Proctor; Rich Franko, all of Seattle; Chris Brady, Bothell; David Wicklander, Seattle; Gary Franz, Seattle; William Burns, Seattle; Matt Gibson, Spokane; Rebecca Jaynes, Seattle, all of Wash.

[73] Assignee: Parvia Corporation, Seattle, Wash.

[21] Appl. No.: 08/937,095

[22] Filed: Sep. 24, 1997

[51] Int. Cl.⁶ ............................. A63H 33/06; G09B 29/12
[52] U.S. Cl. ............................................. 446/118; 434/152
[58] Field of Search ...................................... 446/110, 115, 446/105, 118, 476, 478; 434/150, 151, 152, 153, 118

[56] References Cited

U.S. PATENT DOCUMENTS

| | | |
|---|---|---|
| D. 304,484 | 11/1989 | Knudsen . |
| D. 306,188 | 2/1990 | Tapdrup et al. . |
| D. 306,190 | 2/1990 | Poulsen . |
| D. 307,775 | 5/1990 | Pedersen . |
| D. 366,914 | 2/1996 | Frederiksen . |
| D. 367,896 | 3/1996 | Knudsen . |
| D. 367,897 | 3/1996 | Schmidt et al. . |
| 1,393,163 | 10/1921 | Rasely . |
| 2,674,813 | 4/1954 | Hutchinson . |
| 2,871,619 | 2/1959 | Walters . |
| 2,942,354 | 6/1960 | Grain . |
| 3,005,282 | 10/1961 | Christiansen . |
| 3,025,626 | 3/1962 | Schumacher . |
| 3,034,254 | 5/1962 | Christiansen . |
| 3,162,973 | 12/1964 | Christiansen . |
| 3,234,683 | 2/1966 | Christiansen . |
| 3,236,004 | 2/1966 | Christiansen . |
| 3,242,610 | 3/1966 | Christiansen . |
| 3,284,946 | 11/1966 | Christiansen . |
| 3,352,054 | 11/1967 | Glass et al. . |
| 3,461,601 | 8/1969 | Kristiansen . |
| 3,475,851 | 11/1969 | Christiansen . |
| 3,597,858 | 8/1971 | Ogsbury . |
| 3,597,875 | 8/1971 | Christiansen . |
| 3,667,153 | 6/1972 | Christiansen . |
| 3,742,620 | 7/1973 | Knoll . |
| 3,981,506 | 9/1976 | Daniel et al. . |
| 4,028,844 | 6/1977 | Dideriksen et al. . |
| 4,176,493 | 12/1979 | Dideriksen . |
| 4,185,410 | 1/1980 | Kristiansen . |
| 4,192,083 | 3/1980 | Rebbeck ............................ 434/152 X |

(List continued on next page.)

FOREIGN PATENT DOCUMENTS 85439  9/1921  Austria .................................. 434/152

*Primary Examiner*—D. Neal Muir
*Attorney, Agent, or Firm*—Christensen O'Connor Johnson & Kindness PLLC

[57] ABSTRACT

The modular terrain for a playing structure, such as a toy building set, includes a plurality of terrain pieces. Some of the terrain pieces have a flat exterior edge. The flat exterior edge is only matable with a flat exterior edge on another of the terrain pieces. The flat exterior edge has spaced longitudinal end points. The flat exterior edge has no change in height between the spaced longitudinal end points. The distance between the spaced longitudinal end points of the flat exterior edge is one of Y, √2Y and 2√2Y. Some of the terrain pieces have a hill exterior edge. The hill exterior edge is only matable with a hill exterior edge on another of the terrain pieces. The hill exterior edge has spaced longitudinal end points. The hill exterior edge has a change in height between the spaced longitudinal end points of X. The distance between the spaced longitudinal end points of the hill exterior edge is Y. Some of the terrain pieces have a slope exterior edge. The slope exterior edge is only matable with a slope exterior edge on another of the terrain pieces. The slope exterior edge has spaced longitudinal end points. The slope exterior edge has a change in height between the spaced longitudinal end points of X. The distance between the spaced longitudinal end points of the sloped exterior edge is 2Y.

40 Claims, 24 Drawing Sheets

U.S. PATENT DOCUMENTS

| | | |
|---|---|---|
| 4,203,248 | 5/1980 | Tapdrup . |
| 4,205,482 | 6/1980 | Christiansen et al. . |
| 4,214,403 | 7/1980 | Knudsen . |
| 4,245,400 | 1/1981 | Johnson . |
| 4,403,733 | 9/1983 | Bach et al. . |
| 4,430,063 | 2/1984 | Bach et al. . |
| 4,430,826 | 2/1984 | Ryaa . |
| 4,461,116 | 7/1984 | Bach . |
| 4,556,393 | 12/1985 | Bolli . |
| 4,579,041 | 4/1986 | Organ et al. . |
| 4,589,702 | 5/1986 | Bach et al. . |
| 4,685,884 | 8/1987 | Rohan . |
| 4,715,832 | 12/1987 | Bach . |
| 4,726,515 | 2/1988 | Bolli et al. . |
| 4,743,202 | 5/1988 | Bach . |
| 4,846,750 | 7/1989 | Tapdrup . |
| 4,854,742 | 8/1989 | Bach . |
| 4,861,306 | 8/1989 | Bolli et al. . |
| 4,874,176 | 10/1989 | Auerbach . |
| 4,883,440 | 11/1989 | Bolli . |
| 4,894,040 | 1/1990 | Bach et al. . |
| 4,897,066 | 1/1990 | Tapdrup et al. . |
| 4,937,181 | 6/1990 | Rogers . |
| 4,978,301 | 12/1990 | Dodge . |
| 4,988,322 | 1/1991 | Knudsen . |
| 4,988,324 | 1/1991 | Ryaa et al. . |
| 4,992,069 | 2/1991 | Bolli et al. . |
| 4,998,903 | 3/1991 | Bolli et al. . |
| 5,011,411 | 4/1991 | Loewy . |
| 5,015,210 | 5/1991 | Dideriksen . |
| 5,042,972 | 8/1991 | Bach et al. . |
| 5,049,078 | 9/1991 | Thomsen . |
| 5,049,104 | 9/1991 | Olsen . |
| 5,071,384 | 12/1991 | Poulsen . |
| 5,087,001 | 2/1992 | Bolli et al. . |
| 5,094,643 | 3/1992 | Bolli et al. . |
| 5,112,263 | 5/1992 | Penillard et al. . |
| 5,251,900 | 10/1993 | Gallant . |
| 5,304,086 | 4/1994 | Bolli et al. . |
| 5,322,466 | 6/1994 | Bolli et al. . |
| 5,326,267 | 7/1994 | Brokaw . |
| 5,348,478 | 9/1994 | Bradshaw . |
| 5,349,734 | 9/1994 | Poulsen et al. . |
| 5,360,364 | 11/1994 | Poulsen et al. . |
| 5,373,791 | 12/1994 | Bach et al. . |
| 5,378,191 | 1/1995 | Ryaa . |
| 5,380,232 | 1/1995 | Berggreen et al. . |
| 5,387,148 | 2/1995 | Dideriksen et al. . |
| 5,417,603 | 5/1995 | De Chazal . |
| 5,427,530 | 6/1995 | Taggart . |
| 5,427,558 | 6/1995 | Knudsen et al. . |
| 5,494,471 | 2/1996 | Ryaa et al. . |
| 5,580,295 | 12/1996 | Ruzskai et al. . |
| 5,596,181 | 1/1997 | Bach et al. . |
| 5,643,038 | 7/1997 | Olsen et al. . |
| 5,645,463 | 7/1997 | Olsen . |

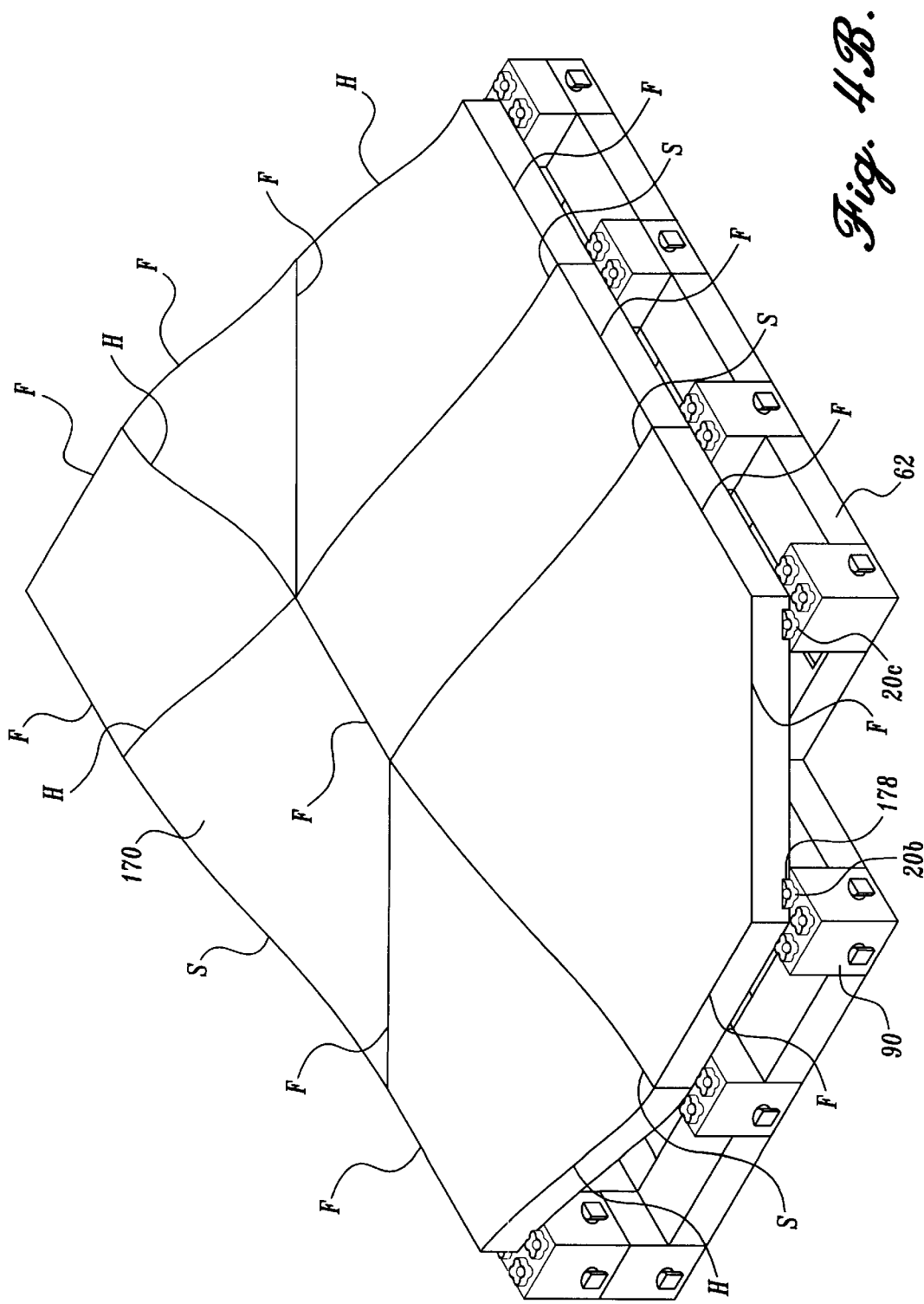

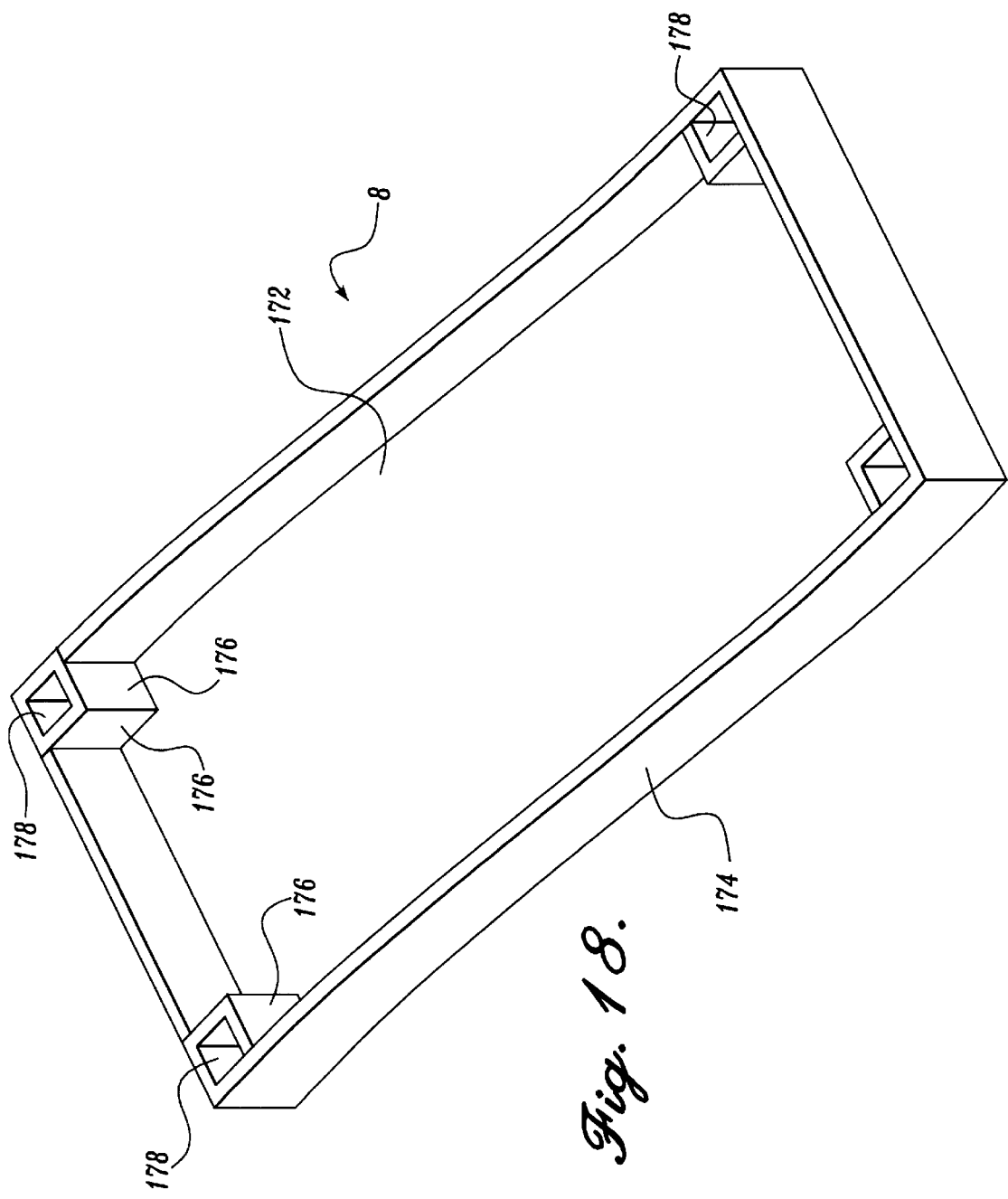

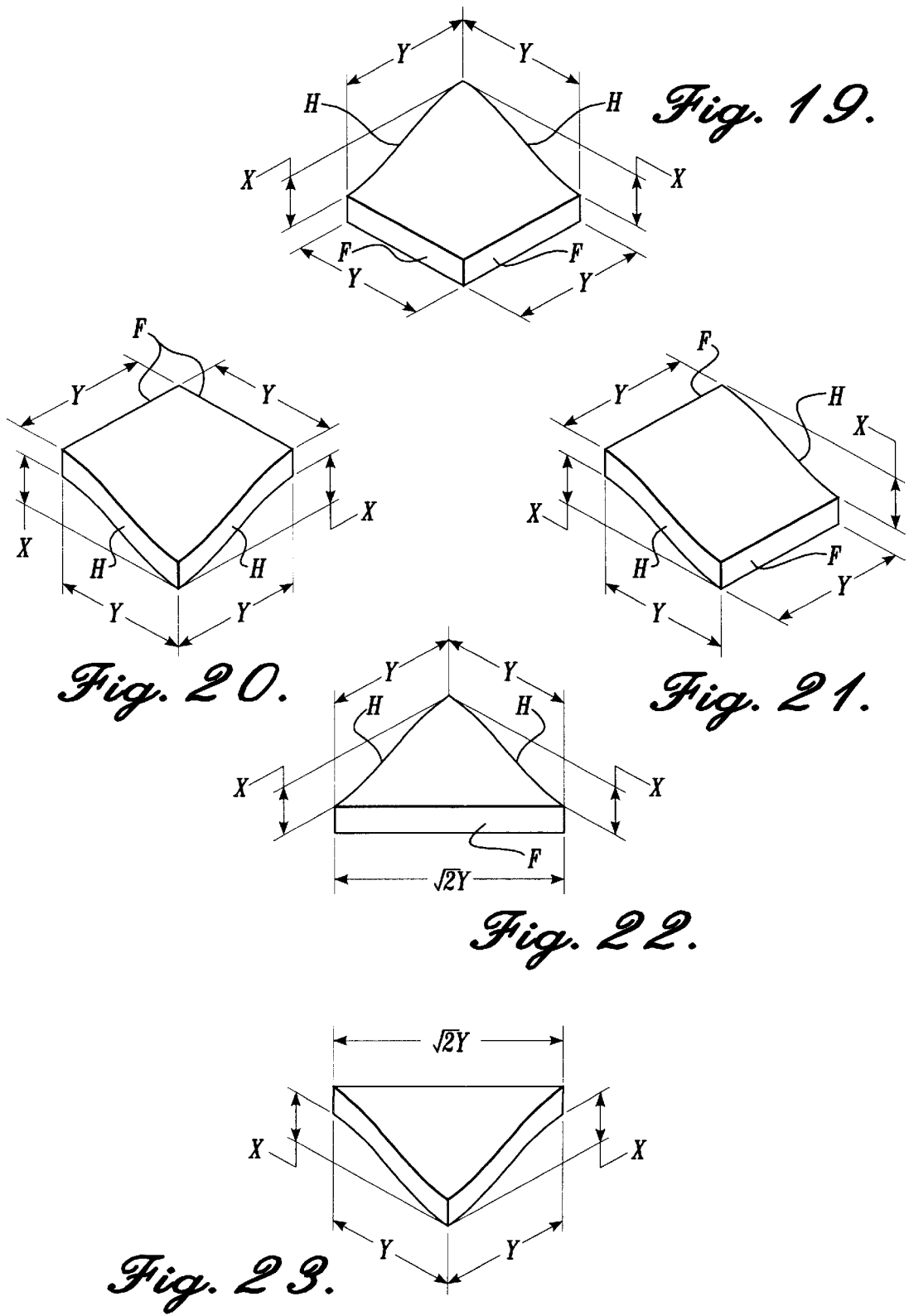

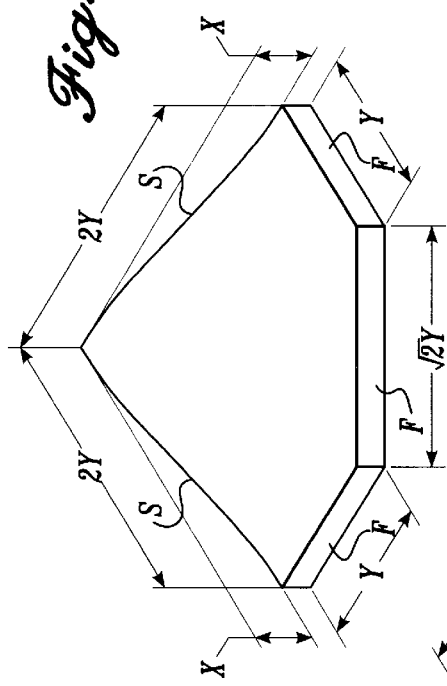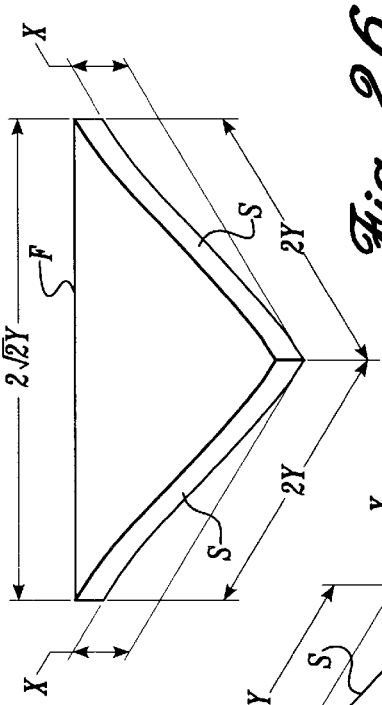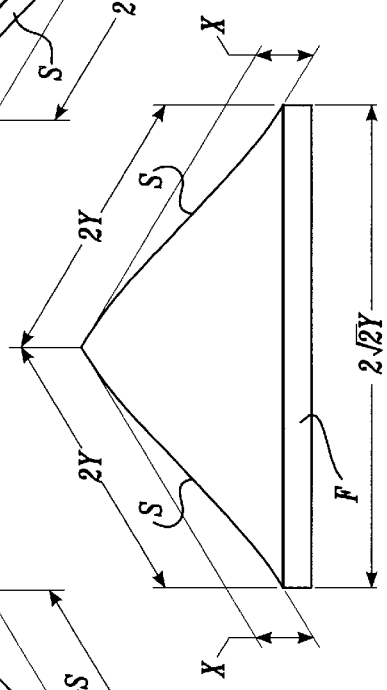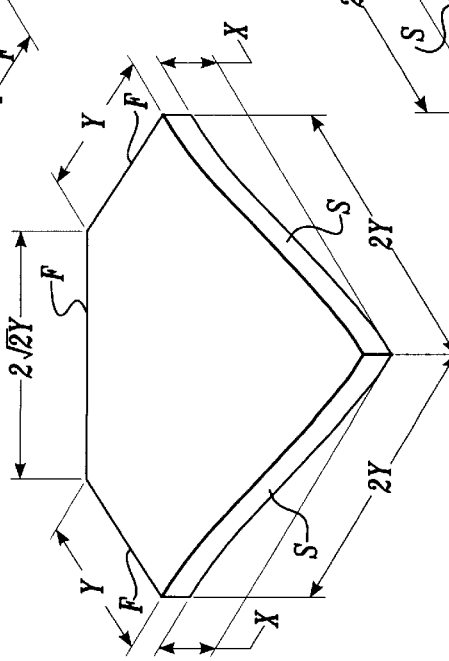

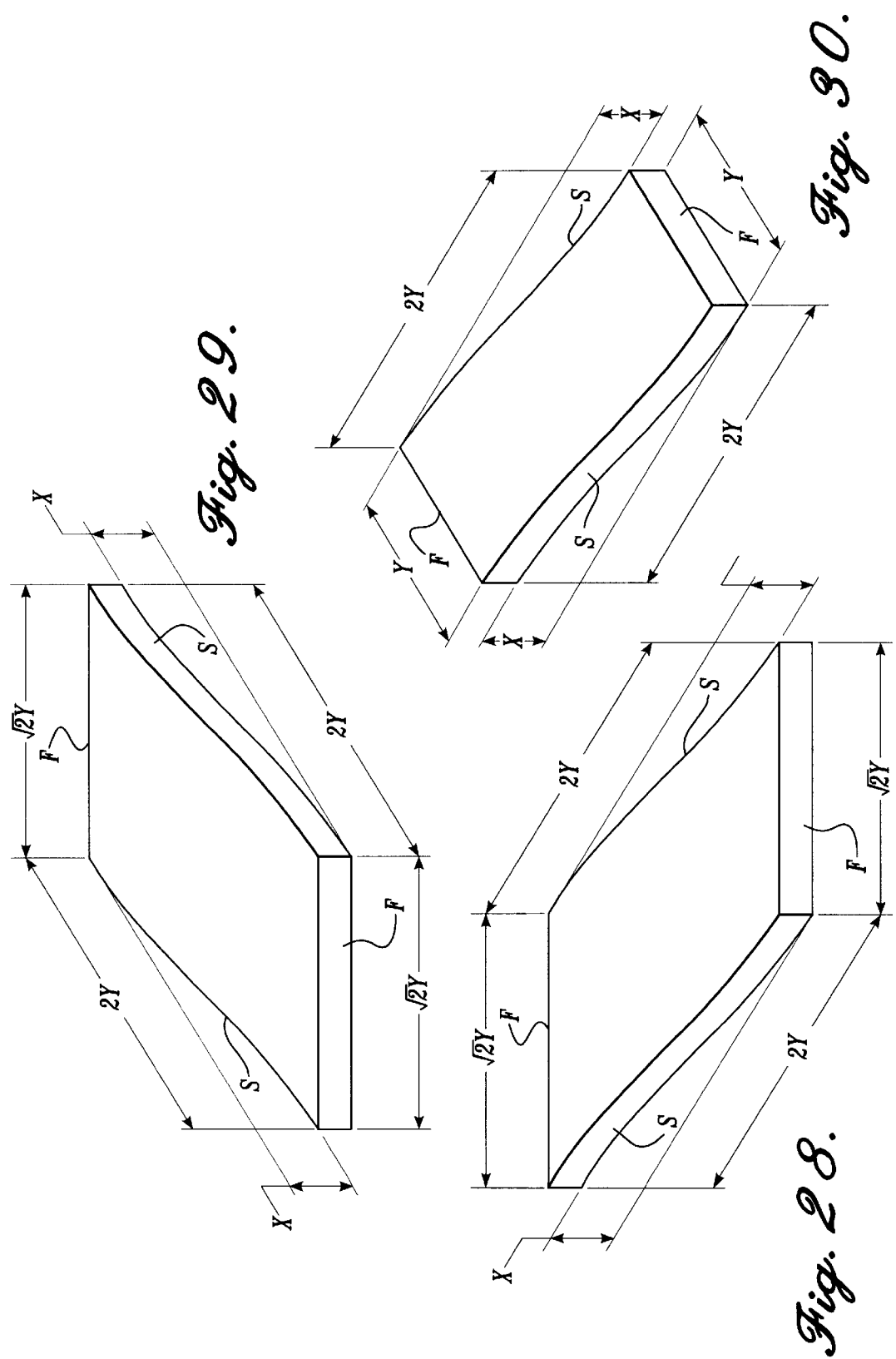

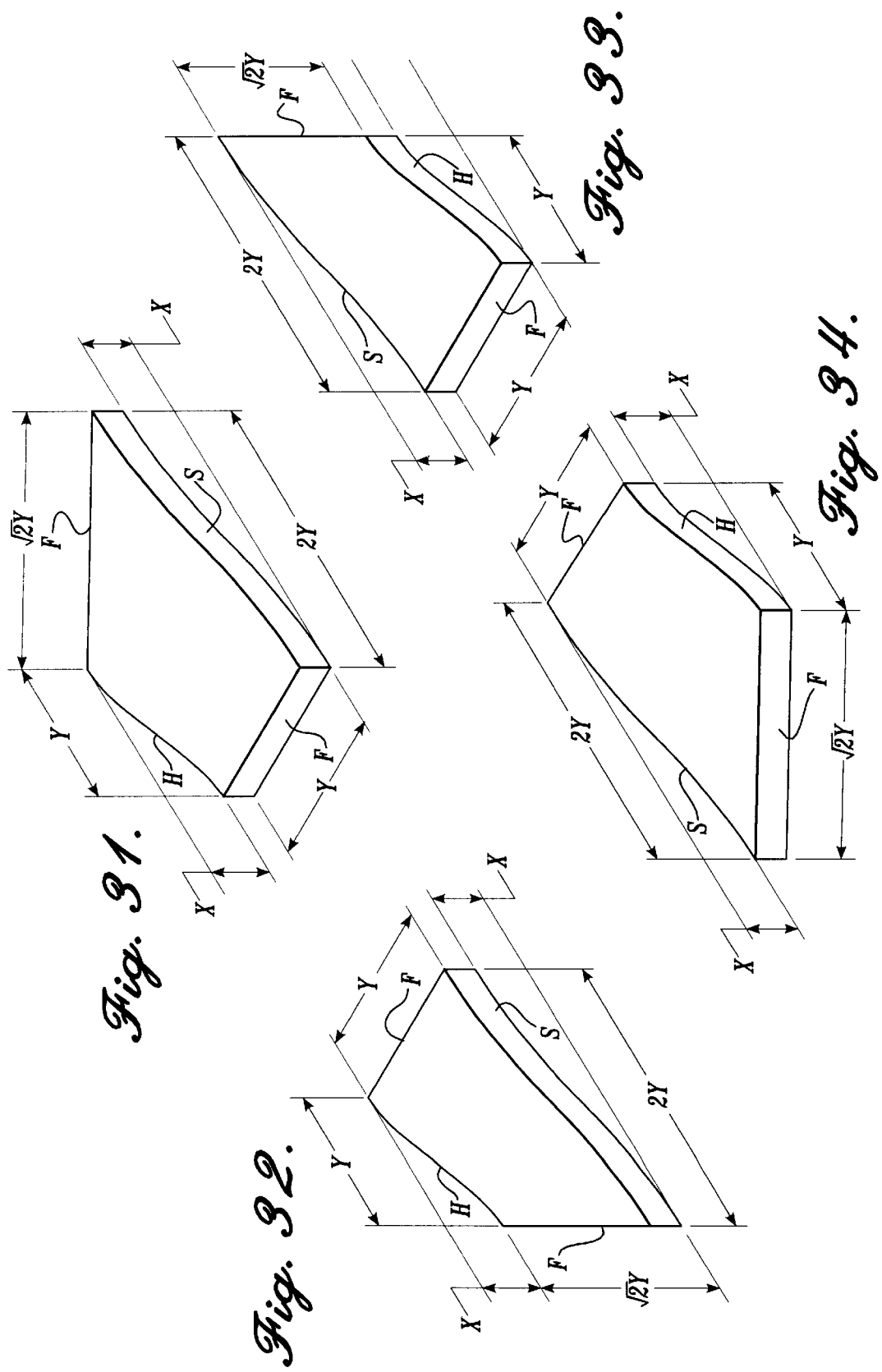

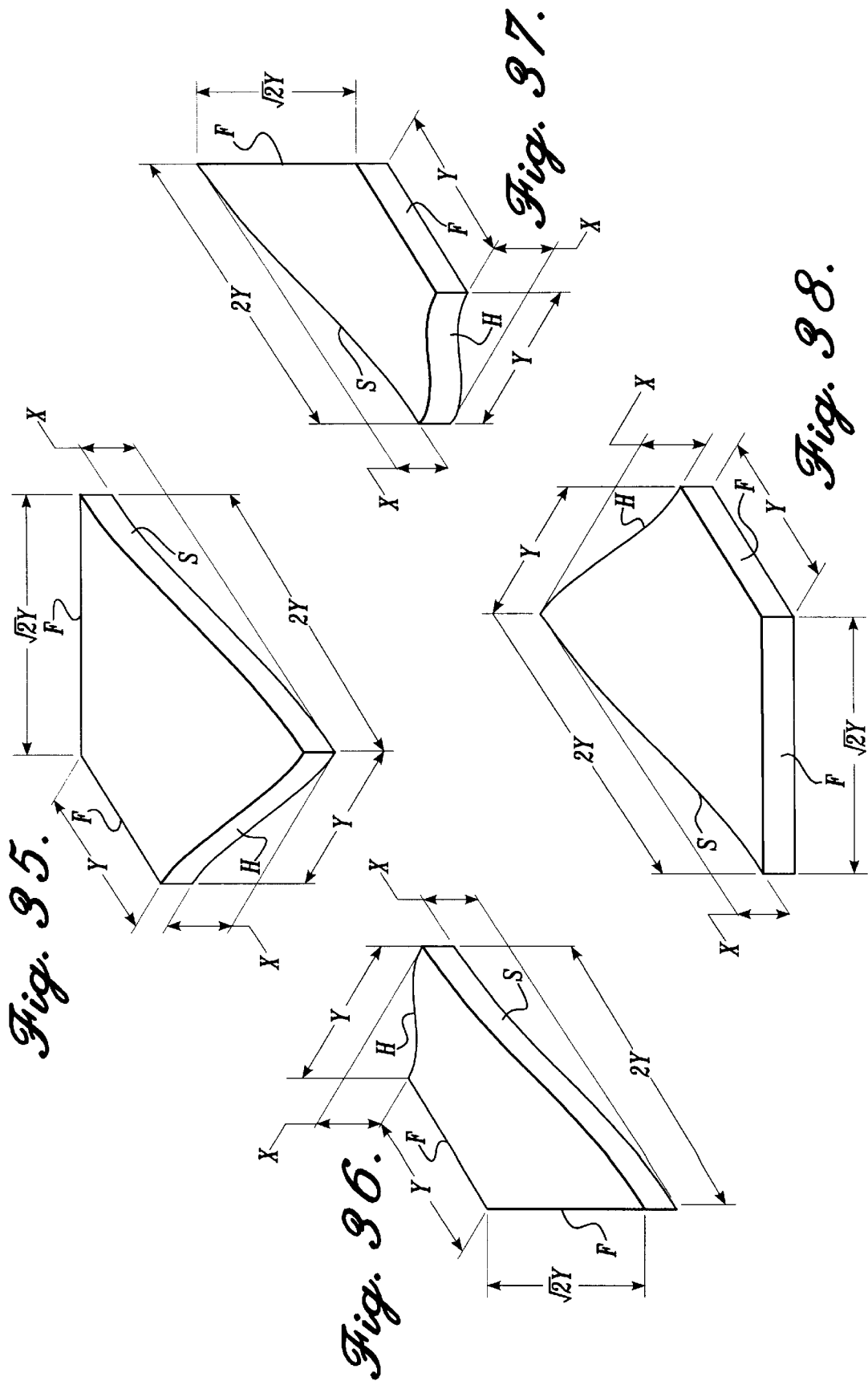

MODULAR TERRAIN FOR A TOY BUILDING SET

FIELD OF THE INVENTION

The invention relates to terrain for a playing structure and, more particularly, to modular terrain removably attachable to a toy building set.

BACKGROUND OF THE INVENTION

In U.S. Pat. No. 5,427,530, a portable water pollution model and method are disclosed that provide an improved device and method for simulating water pollution. This invention includes a portable simulated watershed model, including a simulated body of water and a simulated water pollution source; a simulated water pollutant, placeable on selected portions of the model; a simulated best management practice for pollution minimization, placeable on selected portions of the model; and a fluid dispenser capable of simulating rain over the watershed model. This invention further includes a method for simulating water pollution including providing a portable simulated watershed model, providing a simulated water pollutant, placing the simulated pollutant on selected portions of the model, providing a simulated best management practice, placing the simulated practice on selected portions of the model, and simulating rain over the model.

In U.S. Pat. No. 5,417,603, a playing structure includes a plurality of playing structure modules connectable together to form an array having a generally continuous, visually fluid, three-dimensional playing surface. Each playing structure module has a reversible top to allow the topography of the playing surface to be changed. The top of each playing structure module has a different three-dimensional topography on either side thereof. Each playing structure module may have a different or the same top. The playing surfaces have a colored landscape painted thereon to depict lakes, countrysides, roadways etc. and the like. The topography of the playing surfaces and the painted landscapes are designed so that the certain symmetries exist. In particular, when a plurality of playing structure modules are assembled to form an array and the tops of the playing structure modules are arranged to provide a playing surface having a continuous, visually fluid landscape, any one of or all of the tops can be reversed along a diagonal and the landscape of the resulting playing surface will still be continuous and visually fluid. This of course increases the number of different playing surfaces which can be created with the playing structure modules.

In U.S. Pat. No. 5,348,478, a modular terrain board is provided having a plurality of sections or terrain cell plugs which are held in place by a baseboard assembly having a corresponding plurality of cell receiving sections or cells formed therein. The terrain cell plugs can be easily removed to allow for quick and accurate reconfiguration of the terrain model. The terrain board has means for representing buildings, rivers, lakes, roads, and other topographical features.

In U.S. Pat. No. 5,326,267, model terrain accessories that are positioned for use on the surface of a miniature landscape are fabricated from a permanently flexible material, preferably polyvinyl chloride. These flexible accessories are realistically contoured models representing roads, streams, stream banks, earthworks, and walls, or segments thereof. These flexible accessories will conform to changes in surface elevation on any miniature landscape on which they are assembled. The flexible accessories fit together easily in an infinite variety of individual and group configurations, and can be easily removed from the landscape surface and reused when desired.

U.S. Pat. No. 5,251,900 discloses a puzzle formed of a plurality of puzzle pieces which, when assembled, create a self-standing, three-dimensional building structure. The puzzle pieces are of irregular, polygonal shape, but all puzzle pieces are flat, planar blocks. The blocks are releasably interlocked about a common plane with first, edgewise, complementary dovetail joints. For interlocking puzzle walls that are transverse to one another, second, straight U-shape, edgewise, complementary tenon and mortise joints are further provided edgewisely of those corner blocks for frictional interlocking. Thus, no separate pin, bent units or the like are required to anchor the corner portions of the three dimensional structure. The self-standing, enclosing structure is continuous, and shows a continuous image on its external face.

U.S. Pat. No. 5,011,411 discloses a method making a non-repetitive modular design. The design is created by assembling a plurality of substantially identical modules to cover a surface. Each module has the shape of a polygon, especially a regular polygon, such as a square. The design of each module is created in the following manner. First, one selects a set of points, disposed symmetrically around the midpoint of a side of the polygon, and duplicates the same pattern of points for the remaining sides. Then, one connects every pair of points with a line, such that the lines so drawn form a pattern which is not symmetrical around any imaginary straight line joining any pair of vertices of the polygon. The spaces between lines, or between one or more lines and one or more sides of the polygon, can be filled in with a color, or with any other design element. To make the final design, one provides a plurality of such modules, and arranges them, with random orientations, to cover a surface. The design is non-repetitive, and any orientation of the individual modules will produce a valid design. The appearance of the design is varied by changing the orientation of one or more of the modules. In general, the appearance of the overall design is quite different from that of each of the modules. The modules made according to the invention can be used as floor tiles, or they can be otherwise secured permanently to a solid substrate for decorative purposes.

In U.S. Pat. No. 4,992,069, the plug-in building blocks of a building set have protruding connecting pins and corresponding mating connecting sockets. In order that bendproof trusses can also be built, the building set has single-row connecting bars with two terminal pins, whose spacing from one another amounts to $\sqrt{2}$ times an integral multiple of the modulus, and girder elements, which at two bordering sides faces each have a single row of pins with modular spacing and parallel to these side faces each have a projection set back by the thickness of the connecting bar. In this way, stable, aesthetically appealing trussings can be built with the building set.

In U.S. Pat. No. 4,988,322, a toy building set for building tree-like models comprises a trunk element and a branch element. The trunk element comprises a trunk portion and projecting branches having coupling means spaced from the trunk portion. The branch element comprises a plurality of connecting bars, at whose ends coupling bushings are provided. These bushings are formed with primary and secondary coupling means respectively, so that the branch elements may be interconnected and connected with the trunk elements. Preferably, said bars have additional branching portions whose ends are provided with bushings similar to the coupling bushings.

U.S. Pat. No. 4,978,301 discloses a construction set suitable and safe for children of various ages comprising construction pieces and connector strips. The construction pieces have a semirigid planar construction with opposing major sides which have hook fastener material disposed on one side and loop pile fastener material disposed on the other. The fastener materials are of the type which adhere when pressed together. An outer border or margin area of the construction pieces is kept free of the fastener materials, to provide a tab or hem for separating attached pieces. The construction pieces have various shapes and sizes with which many designs and structures may be constructed. The connector strips have a similar construction to the construction pieces and are used to join adjacent construction pieces. The sides may include complementary colors and patterns.

U.S. Pat. No. 4,937,181 discloses an educational visual display system for teaching geography in which objects having some geographical or topographical significance, e.g., states of the Union, may be detachably affixed and arranged to demonstrate relationship between the objects. The system includes a primary background surface of iron velvet fabric material to which hook type fasteners may be detachably adhered, a plurality of primary objects having geographical significance and comprising a soft foam core with a layer of iron velvet fabric on one side and a plurality of hook type fasteners on the other side, the primary objects being arrangeable to represent in combination a larger geographical unit, and a plurality of secondary objects each having geographical or topographical significance and having hook type fasteners on one side thereof for being detachably affixable to the layer of iron velvet fabric of the primary objects. The iron velvet fabric and the hook type fasteners function as an attachment pair similar to hook and loop fasteners sold under the trade name VELCRO®.

U.S. Pat. No. 4,874,176 discloses a three-dimensional puzzle including puzzle pieces having discrete surfaces, at least one surface of which has a three-dimensional sculpted form whereby the sculpted surfaces in the aggregate upon assembly of the puzzle form a continuous three-dimensional pictorial representation. Abutting sides of the puzzle pieces may be interlocking or three-dimensional for conformal abutting relation with the sides of opposed puzzle pieces. Filler pieces are also provided underlying the puzzle pieces for elevating the sculpted surfaces of the puzzle pieces. The puzzle pieces and filler pieces may be disposed on a base which may have an edge containment whereby non-interlocking puzzle and filler pieces may be used. The puzzle and filler pieces may be vertically interlocked against lateral movement and with respect to the base by projections received in corresponding recesses.

In U.S. Pat. No. 4,846,750, a base for a building set is provided with coupling studs for mounting building blocks having corresponding coupling elements. The base is further provided with cavities contoured to receive at least some of the building blocks. The cavities preferably extend from the side opposite the side provided with the coupling studs.

U.S. Pat. No. 4,743,202 discloses a toy building block having on one face thereof at least one row of mechanical coupling pins and opposite thereto mechanical counter-coupling tubes for coupling said toy building block to a similar toy building block either with the row of said coupling pins parallel to a corresponding row of coupling pins of said similar block or perpendicular to said corresponding row. The toy building block includes first and second current paths connected to first and second contact areas respectively designed to establish electrical connection with first and second contact areas in a similar block. The first and second contact areas are disposed in first and second angular sectors about adjacent coupling pins. The angular sectors are offset from each other and do not overlap regardless of whether the building block row of coupling pins is parallel or perpendicular to the row of coupling pins of the similar block.

U.S. Pat. No. 4,715,832 discloses a building element of the type which contains current-carrying components placed in the electrically insulated building block. There are provided at least two current-carrying components with respective contact areas which are mutually- co-axially positioned. The building blocks can be intercoupled mechanically while establishing electrical connection between the respective current rails in the cooperating building elements, without any risk of short circuiting between the two current-carrying components, no matter how the building blocks are intercoupled mechanically.

U.S. Pat. No. 4,685,884 discloses a multitude of parts of three-dimensional shape have full edges and also edge segments adapted for abutment with like edges and edge segments of other parts. The parts additionally include non-abutting irregular or curved edges which may represent terrain contour lines or the bank of a body of water. Inclined areas on the parts are adjacent the irregular or curved edges and represent sloped terrain which is continuous with like inclined areas on other abutting parts. The inclined area of a part may be dispensed with to provide a vertical surface to simulate an escarpment.

U.S. Pat. No. 4,556,393 discloses a building block having side walls and a perpendicular front with two rows of coupling pins on one side of the front face and counter-coupling tubes on the other side for mechanically coupling two building blocks by means of a clamping action. In each row, each second coupling pin has an electrically conducting surface, while the coupling pins lying between these are electrically insulating. One row of conducting pins is displaced in the direction of the rows by one coupling pin from the adjacent row. On the other side of the front wall a contact bar is arranged which is connected electrically with the conducting coupling pins of an associated row. The bar has a contact area for producing electrical contact with a row of conducting coupling pins of an adjacent, coupled building block.

U.S. Pat. No. 4,461,116 discloses a connecting member comprising an elastically deformable, tubular plug slitted at the ends for interconnecting pairs of building components, which have coupling holes to receive the ends of the connecting member. Apertures are in the plug wall between the slits. The plug wall is formed with lengthwise extending clamping wedges between the apertures. The clamping wedges have inclined faces which slope towards the ends of the connecting member and cause the connecting member to be compressed at the center and be expanded at the ends when it is pressed into a pair of co-axial holes in adjacent building components. The connecting member may in particular be formed with an annular flange and end beads which fit in corresponding annular grooves in a pair of adjacent components.

U.S. Pat. No. 4,245,400 discloses a three dimensional toy having a base member showing a housing development with structural profile members mounted thereon which are secured by profile locking elements for constructing elevations of roadways, lots and surrounding terrain. The profile members and locking elements also serve as retaining walls for soil which, when shaped to conform to the contours of the profile members and locking elements and provided with living plants defines the topography of a living housing development.

U.S. Pat. No. 4,185,410 discloses a suspension device for slideable and pivotal suspension of a base plate for toy building sets or base boards for visual planning panels. One face of the base plate or board is provided with rows of coupling studs including a plurality of studs uniformly spaced apart in both longitudinal and transverse directions, and the suspension device includes a gripping member having inwardly projecting guides adapted to slide along the base plate between a pair of rows of projections and to support the base plate when suspended on a wall. The device is further provided with a hinge member pivotally mounted on top of the gripping member, so as to provide for pivotal movements of the base plate relatively to a wall on which the base plate is mounted by means of the slideable suspension device.

U.S. Pat. No. 4,176,493 discloses a rotatable element comprising a base plate and a disc pivotally mounted in a circular aperture in the base plate. A socket for a pivot on the disc is located at the bottom of the plate and is supported thereon by ribs integral with the socket and with four side walls at the bottom of the base plate. Four identical apertures in the bottom of the base plate are formed by the socket, the ribs and the side walls. Four engagement studs are provided on the top face of the disc and extend beyond the periphery thereof. The underface of these studs provides for slideable contact with the top face of the base plate during the rotation of the disc.

In U.S. Pat. No. 3,981,506, a plurality of parallelepiped blocks having varying heights, planar sides and a curved upper surface are connected together by special pin and hole interlocks randomly spaced in predetermined locations to form a three dimensional puzzle with at least a curved upper surface. Two or more puzzles can be made by initially assembling the blocks into a polyhedron with six rectangular faces and sawing along a predetermined path to separate the polyhedron into individual puzzles.

In U.S. Pat. No. 3,742,620, there is provided an apparatus for demonstrating the inter-relationship of a landscape, and the contour lines representing said landscape in two- and three-dimensional representation. A transparent plate is supported over and free from the model and contour lines connecting points of the same height on the model are drawn upon the said plate using a substantially ablative transfer material, said contour lines are transferred onto transfer receiving material slabs and layers of the material corresponding to the contour lines are produced by cutting along the contour lines. The contour slabs are then stacked upon each other to give a three-dimensional representation of the model. In a further modification, the contour slabs are colored in such a manner that at least adjacent slabs are of a different color. Upon compression of the contour model by a transparent plate, a two-dimensional contour representation is again visible.

U.S. Pat. No. 3,667,153 discloses the coupling of two plate-shaped elements by means of an interlocking arrangement formed along the edges of the elements. The locking members of one element are in resilient engagement with identical locking members on the other element, the thickness of the individual locking members being half the thickness of the element, and the members being staggered alternately to one side and the other of a plane through the center of the edge parallel to the side faces of the element.

U.S. Pat. No. 3,597,875 discloses toy building blocks of similar shape but constructed to different modules. The inner protrusions of the smaller blocks coact with the outer projections of the larger blocks.

In U.S. Pat. No. 3,597,858, there is provided a plurality of building elements dimensionally related to conform to a selected scale having interlocking socket and beaded joint portions which may be assembled into a wide variety of composite structures including scale model buildings. The socket joint portion is slotted for insertion of the beaded joint portion and firmly grips the beaded joint portion to hold the elements in particular angular relation while at the same time permitting substantial forced rotational and sliding movement between elements. One of the elements is a flat panel which may be of a variety of geometric shapes and another of the elements is a connector of preselected lengths having plural joint portions arranged in angular spaced relation to one another about a common midpoint.

SUMMARY OF THE INVENTION

The modular terrain for a playing structure, such as a toy building set, includes a plurality of terrain pieces. Some of the terrain pieces have a flat exterior edge. The flat exterior edge is only matable with a flat exterior edge on another of the terrain pieces. The flat exterior edge has spaced longitudinal end points. The flat exterior edge has no change in height between the spaced longitudinal end points. The distance between the spaced longitudinal end points of the flat exterior edge is one of Y, $\sqrt{2}Y$ and $2\sqrt{2}Y$. Some of the terrain pieces have a hill exterior edge. The hill exterior edge is only matable with a hill exterior edge on another of the terrain pieces. The hill exterior edge has spaced longitudinal end points. The hill exterior edge has a change in height between the spaced longitudinal end points of X. The distance between the spaced longitudinal end points of the hill exterior edge is Y. Some of the terrain pieces have a slope exterior edge. The slope exterior edge is only matable with a slope exterior edge on another of the terrain pieces. The slope exterior edge has spaced longitudinal end points. The slope exterior edge has a change in height between the spaced longitudinal end points of X. The distance between the spaced longitudinal end points of the sloped exterior edge is 2Y.

Most preferably, the terrain pieces have a bottom, and the bottom has attachment fittings thereon removably attachable to complementary attachment fittings on a substructure, such as a lattice. The lattice substructure has orthogonal elongate lattice members. The hill exterior edges and the slope exterior edges are disposed parallel or perpendicular to all of the elongate lattice members. While the flat exterior edges can also be disposed parallel or perpendicular to all of the elongate lattice members, the flat exterior edges are the only exterior edges configurable diagonally to the elongate lattice members. The lattice substructure preferably has attachment nodes. The flat exterior edges diagonally disposed to the elongate lattice members and spanning two attachment nodes have a distance between their spaced longitudinal end points of $\sqrt{2}Y$. The flat exterior edges diagonally disposed to the elongate lattice members and spanning three attachment nodes have a distance between their spaced longitudinal end points of $2\sqrt{2}Y$. The flat exterior edges disposed parallel or perpendicular to the elongate lattice members and spanning two attachment nodes have a distance between their spaced longitudinal end points of Y.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4B is an isometric view of the lattice and terrain of the modular toy building set embodying the present invention;

FIG. 18 is an isometric bottom view of a modular terrain piece of the modular toy building set embodying the present invention;

FIG. 19 is an isometric top view of a first embodiment of a modular terrain piece of the modular toy building set embodying the present invention;

FIG. 20 is an isometric top view of a second embodiment of a modular terrain piece of the modular toy building set embodying the present invention;

FIG. 21 is an isometric top view of a third embodiment of a modular terrain piece of the modular toy building set embodying the present invention;

FIG. 22 is an isometric top view of a fourth embodiment of a modular terrain piece of the modular toy building set embodying the present invention;

FIG. 23 is an isometric top view of a fifth embodiment of a modular terrain piece of the modular toy building set embodying the present invention;

FIG. 24 is an isometric top view of a sixth embodiment of a modular terrain piece of the modular toy building set embodying the present invention;

FIG. 25 is an isometric top view of a seventh embodiment of a modular terrain piece of the modular toy building set embodying the present invention;

FIG. 26 is an isometric top view of an eighth embodiment of a modular terrain piece of the modular toy building set embodying the present invention;

FIG. 27 is an isometric top view of a ninth embodiment of a modular terrain piece of the modular toy building set embodying the present invention;

FIG. 28 is an isometric top view of a tenth embodiment of a modular terrain piece of the modular toy building set embodying the present invention;

FIG. 29 is an isometric top view of an eleventh embodiment of a modular terrain piece of the modular toy building set embodying the present invention;

FIG. 30 is an isometric top view of a twelfth embodiment of a modular terrain piece of the modular toy building set embodying the present invention;

FIG. 31 is an isometric top view of a thirteenth embodiment of a modular terrain piece of the modular toy building set embodying the present invention;

FIG. 32 is an isometric top view of a fourteenth embodiment of a modular terrain piece of the modular toy building set embodying the present invention;

FIG. 33 is an isometric top view of a fifteenth embodiment of a modular terrain piece of the modular toy building set embodying the present invention;

FIG. 34 is an isometric top view of a sixteenth embodiment of a modular terrain piece of the modular toy building set embodying the present invention;

FIG. 35 is an isometric top view of a seventeenth embodiment of a modular terrain piece of the modular toy building set embodying the present invention;

FIG. 36 is an isometric top view of an eighteenth embodiment of a modular terrain piece of the modular toy building set embodying the present invention;

FIG. 37 is an isometric top view of a nineteenth embodiment of a modular terrain piece of the modular toy building set embodying the present invention; and FIG. 38 is an isometric top view of a twentieth embodiment of a modular terrain piece of the modular toy building set embodying the present invention.

DETAILED DESCRIPTION OF THE PREFERRED EMBODIMENTS

Figure 1:
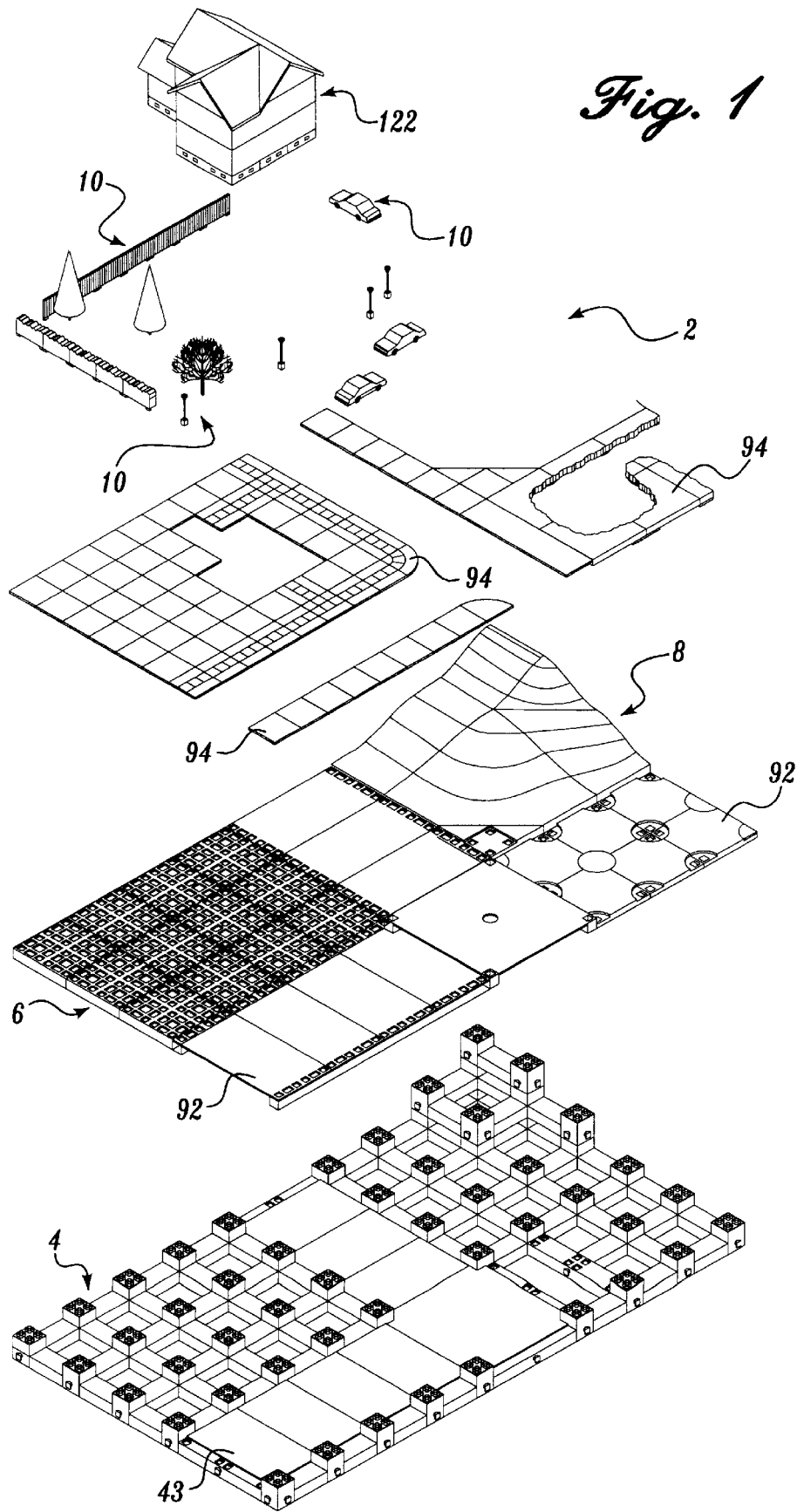
FIG. 1 is an exploded isometric view of the modular toy building set embodying the present invention.
Figure 2:
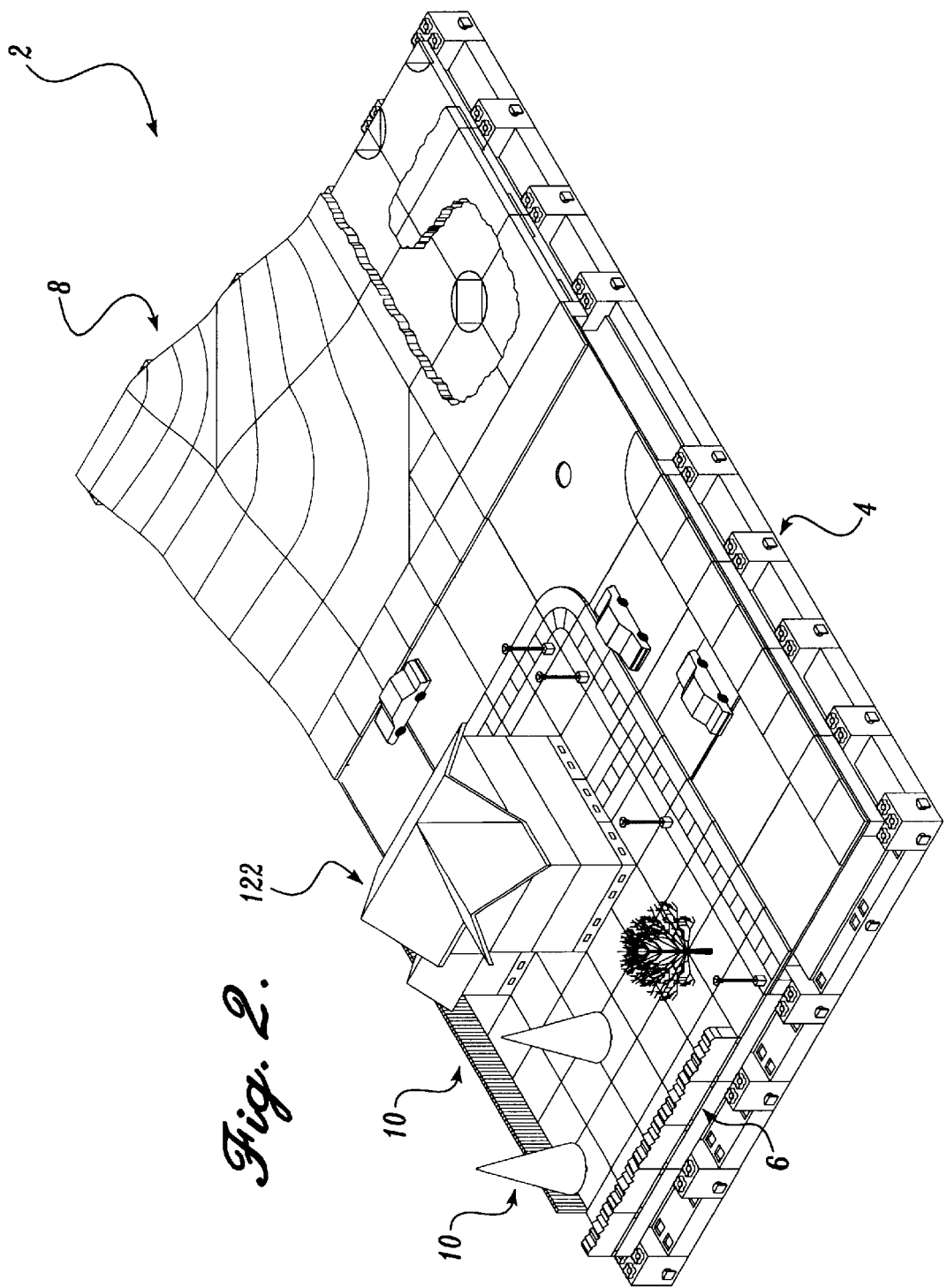
FIG. 2 is a isometric view of the modular toy building set embodying the present invention.
Figure 3:
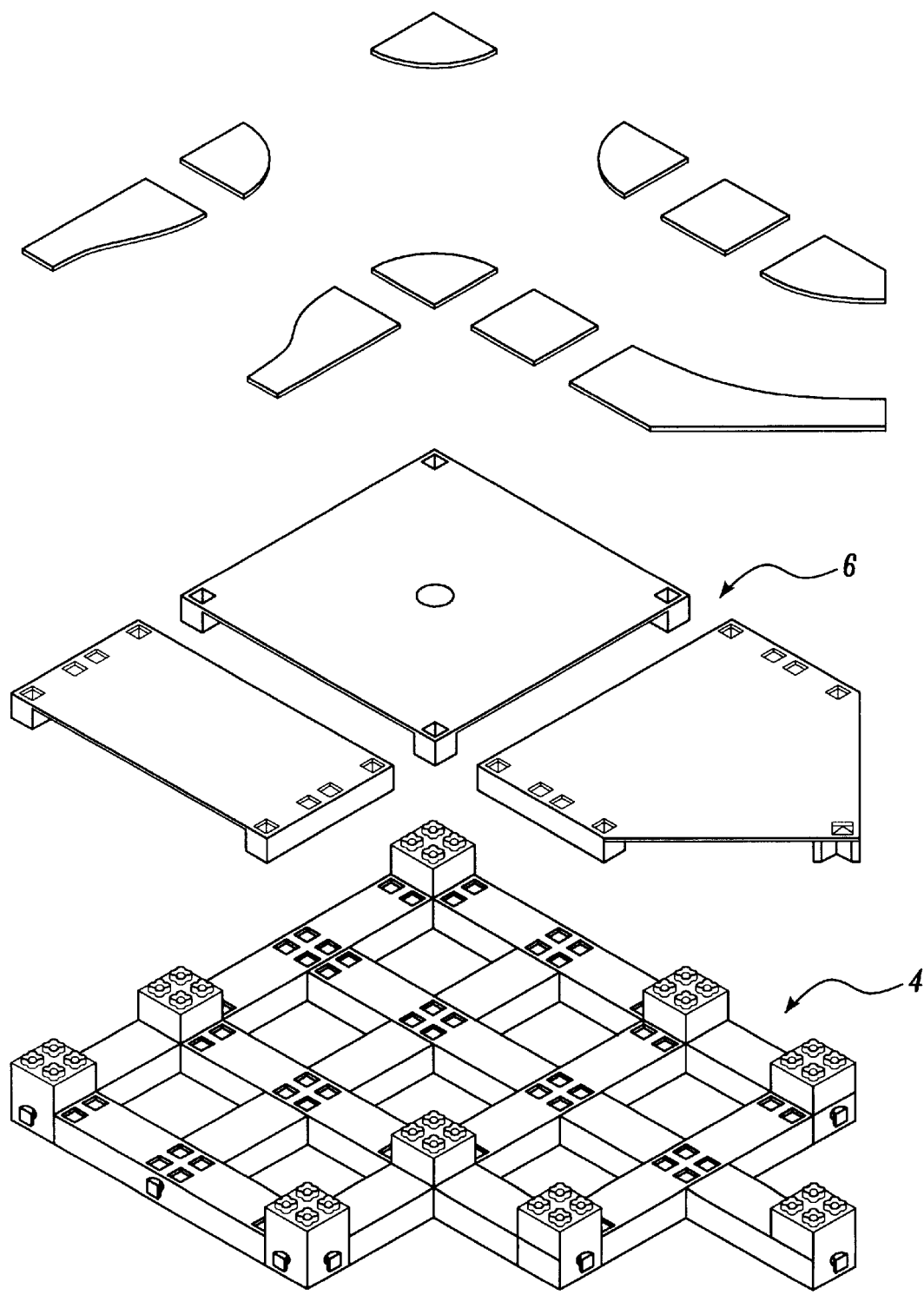
FIG. 3 is an exploded isometric view of the lattice and base of the modular toy building set embodying the present invention.

Referring to FIGS. 1–4, modular toy building set 2 generally includes lattice 4, base 6, terrain 8, and playing components 10. More specifically, lattice 4 supports, and is removably attachable to, base 6 as shown in FIG. 3. In turn, base 6 supports, and is removably attachable to playing components 10. Lattice 4 also supports, and is removably attachable to terrain 8, as shown in FIG. 4. The modular aspects of lattice 4, base 6, terrain 8, and playing components 10 allows a multitude of different configurations to be created with modular toy building set 2 while employing the same elements of lattice 4, base 6, terrain 8, and playing components 10. Lattice 4, base 6, terrain 8, and playing components 10 are preferably comprised of a synthetic polymer such as acrylonitrilebutadiene styrene (ABS). This synthetic polymer can be extruded or injection molded to form lattice 4, base 6, terrain 8, and playing components 10.

Figure 4A:
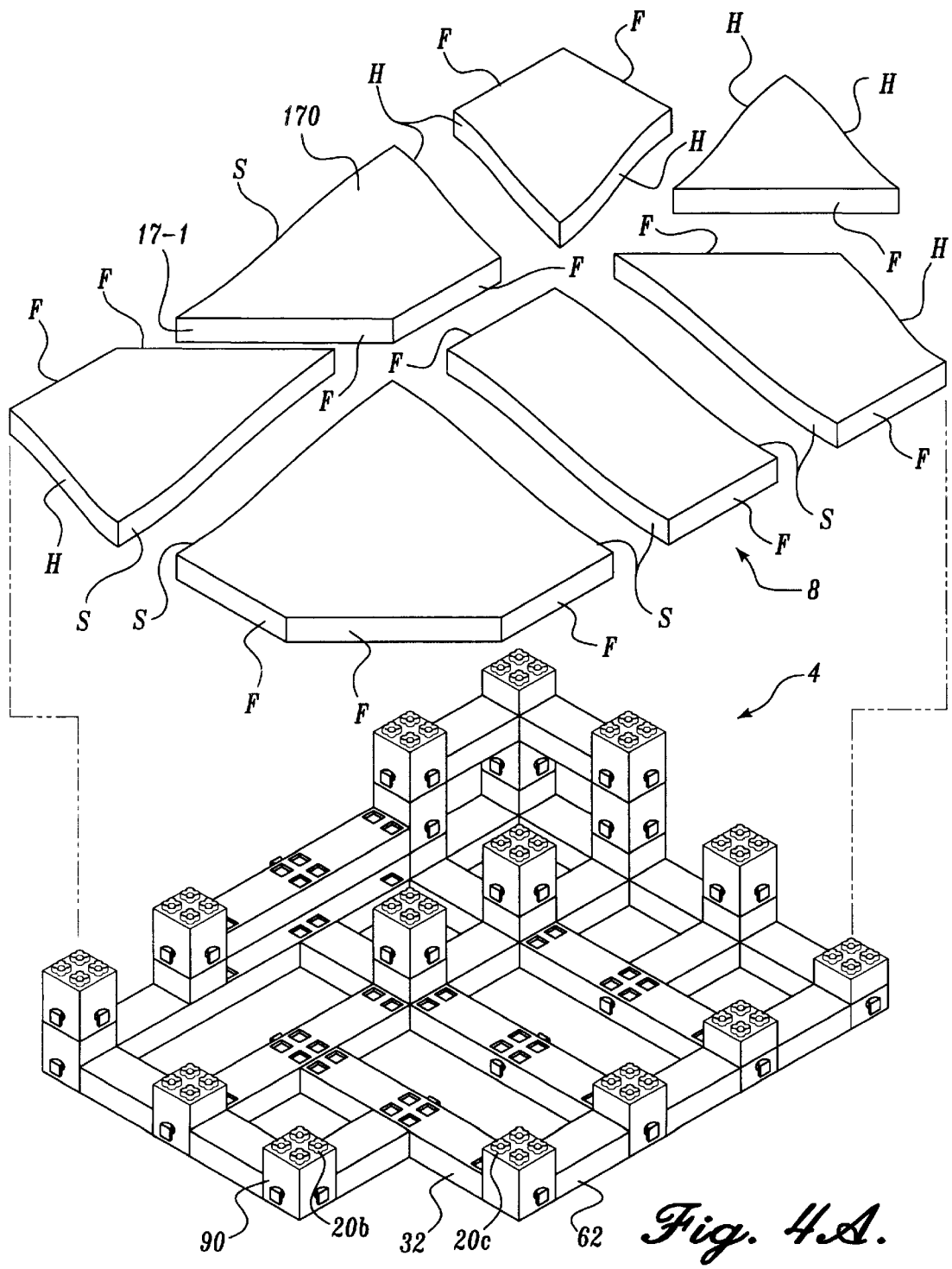
FIG. 4A is an exploded isometric view of the lattice and terrain of the modular toy building set embodying the present invention.
Figure 5:
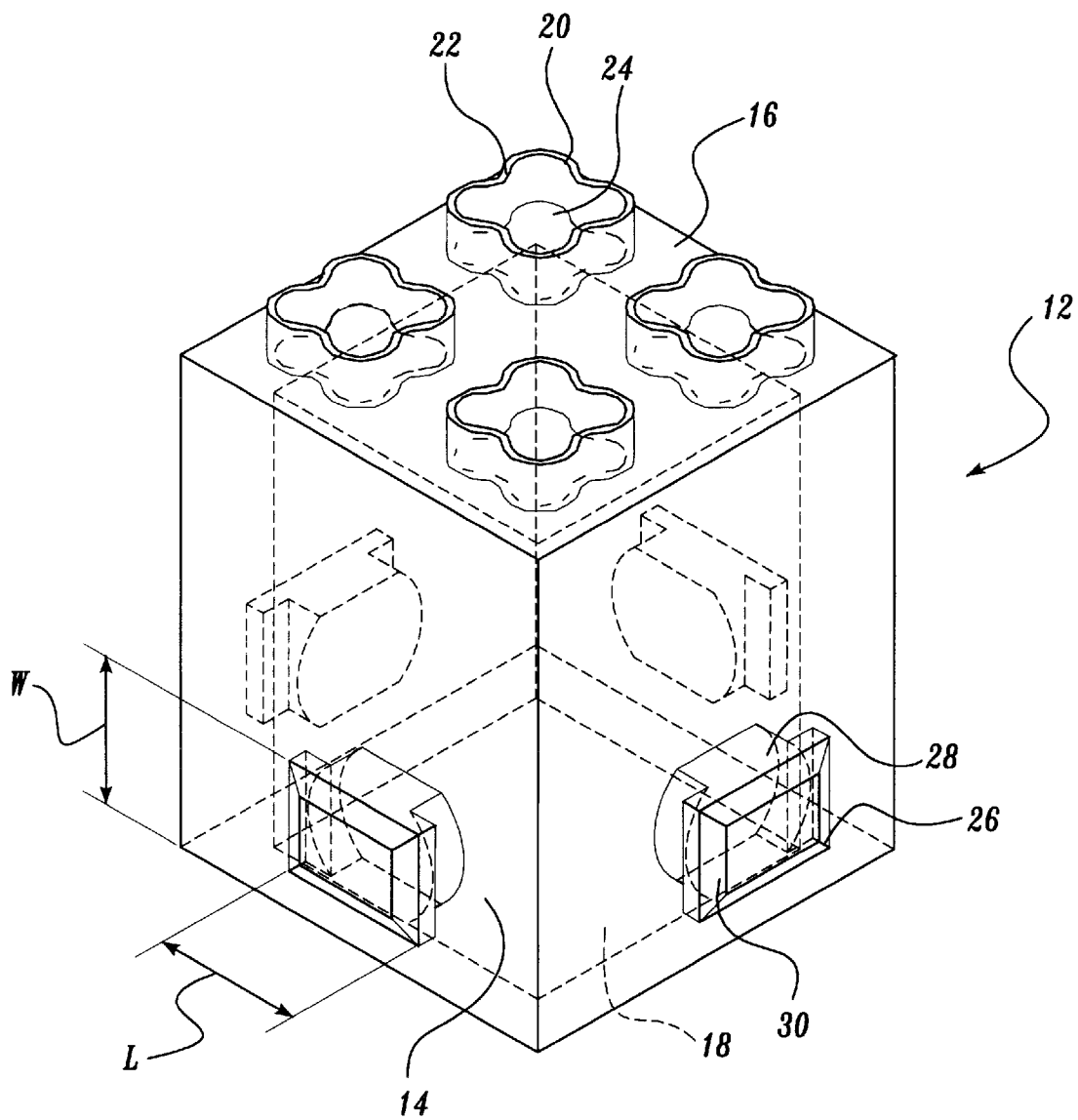
FIG. 5 is a isometric view of the column of the lattice of the modular toy building set embodying the present invention.

Referring to FIG. 5, column 12 of lattice 4 is shown in detail. Column 12 is substantially cubic in shape, but preferably has a height slightly greater than its width. Column 12 has four sides 14, a top 16, and a bottom 18. Male fittings 20 are preferably located on top 16 of column 12. Each male fitting 20 has a peripheral wall 22 and a center recess 24. Additionally, while male fittings 20 are shown on top 16 of column 12, male fittings 20 could, instead, be female fittings provided that the component to which top 16 of column 12 is to be attached has the appropriate mating fitting thereon. Similarly, as discussed throughout the rest of this description, wherever a female fitting (or conversely male fitting) is mentioned, a male fitting (or conversely a female fitting) can be employed in its stead as long as complementary fittings are present on components to be removably attached. Bottom 18 of column 12 preferably has a plurality of female fittings in the same configuration and orientation as the male fittings 20 on top 16 of column 12. The male fittings 20 on top 16 and the female fittings on bottom 18 of column 12 allow for secure, removable vertical stacking of a plurality of columns 12, as shown in FIG. 4, in order to vary the height of lattice 4. While male fittings 20 on top 16 of column 12 are substantially clover leaf in shape, the male fittings discussed herein, as well as the female fittings, can be of any shape that provides removable attachment of two components with a secure connection when attached. Each of sides 14 of column 12 preferably has a protrusion connector 26 thereon. Each protrusion connector 26 has a shaft 28, and a head 30 on the end of shaft 28. Protrusion connectors 26 are sized and shaped to mate with complementary slot connectors on other components in a manner further described below.

Figure 6:
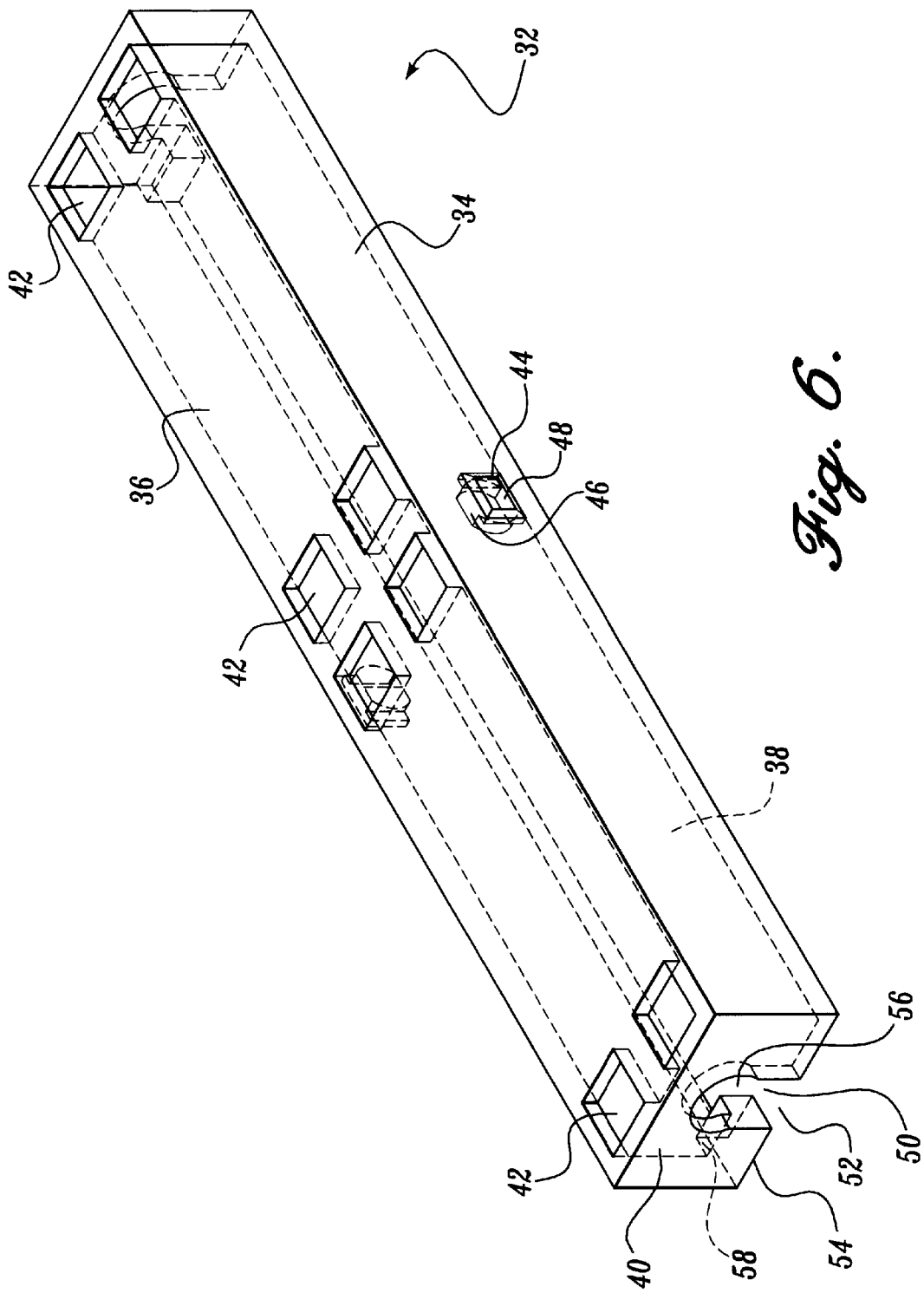
FIG. 6 is a isometric view of the beam of the lattice of the modular toy building set embodying the present invention.

Next, referring to FIG. 6, beam 32 is an elongate preferably rectangular member having sides 34, top 36, bottom 38, and ends 40. Beam 32 preferably has a height less than the height of column 12. Top 36 of beam 32 preferably has a plurality of female fittings 42 thereon. Most preferably, female fittings 42 are located in the center of top 36 and on each end of top 36. Still referring to FIG. 6, female fittings 42 are shown as having a substantially square cross section that has an interference fit with mating male fittings that can, for example, be clover leaf in shape. However, as stated above, female fittings 42 can have other shapes. Female fittings 42 can be employed to removably attach underground roadways 43, as shown in FIG. 1, that are straddled by adjacent columns 12. Underground roadways 43 have mating male fittings on the under surface thereof and allow movement of underground vehicles, or "moles", that guide transport of surface road vehicles by magnetic interconnection.

Again referring to FIG. 6, bottom 38 of beam 32 has a plurality of female fittings thereon such that beam 32 can be supported by columns 12. A protrusion connector 44 is preferably centrally located on each of sides 34 of beam 32. Each protrusion connector 44 has a shaft 46 with a head 48 thereon. Protrusion connector 44 is removably attachable to a slot connector on a component to be removably secured in a manner further described below. Slot connector 50 is located in end 40 of beam 32. Slot connector 50 is an elongate opening having an entrance 52 in lower edge 54 of end 40 of beam 32. Entrance 52 is narrowed in relation to slot terminus 56 such that slot connector 50 can be generally described as being key hole in shape. Beam 32 is preferably at least partially hollow such that head stop 58 can be located within beam 32 adjacent entrance 52 of slot connector 50. Slot connector 50, and other slot connectors described below, while described herein as being an elongate key shaped slot, can generally be a receptive connector of any shape matable with a complementary protrusion connector.

Figure 7:
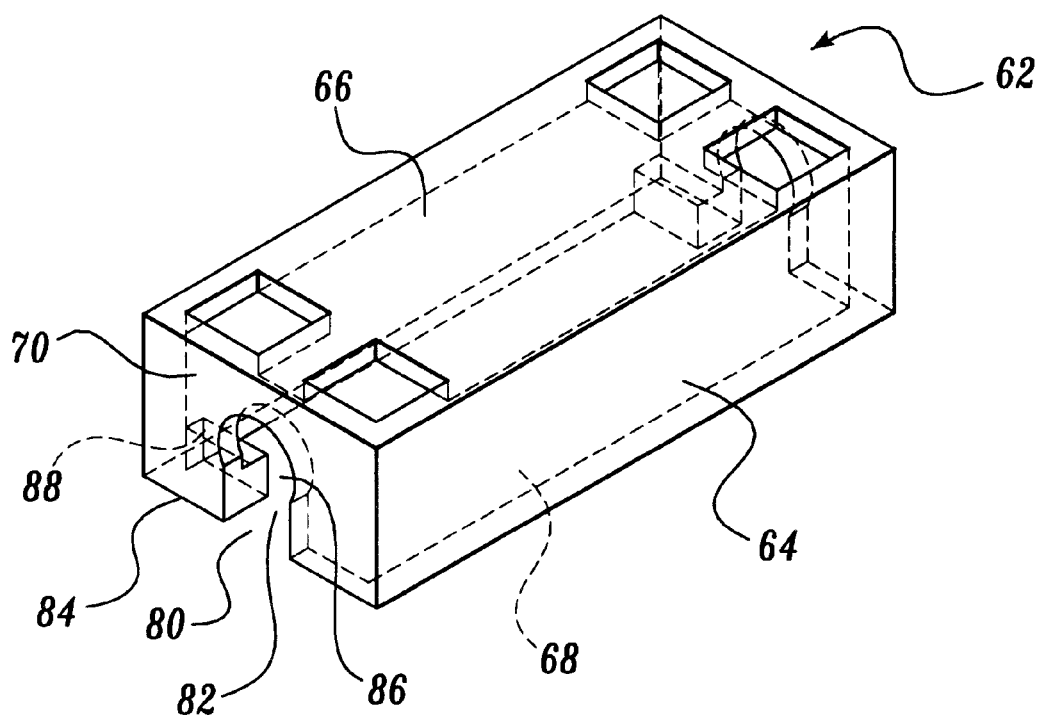
FIG. 7 is a isometric view of the joist of the lattice of the modular toy building set embodying the present invention.

Next, referring to FIG. 7, elongate joist 62 is a preferably rectangular member having a length somewhat less than the length, and preferably less than half the length, of elongate beam 32. Joist 62 is an elongate preferably rectangular member having sides 64, top 66, bottom 68, and ends 70. Joist 62 preferably has a height less than the height of column 12. Bottom 68 of joist 62 has a plurality of female fittings thereon such that joist 62 can be supported by columns 12, other beams, or elongate beams to be described below. Slot connector 80 is located in end 70 of joist 62. Slot connector 80 is an elongate opening having an entrance 82 in lower edge 84 of end 70 of joist 62. Entrance 82 is narrowed in relation to slot terminus 86 such that slot connector 80 can be generally described as being key hole in shape. Joist 62 is preferably at least partially hollow such that head stop 88 can be located in joist 62 adjacent entrance 82 of slot connector 80.

Figure 8:
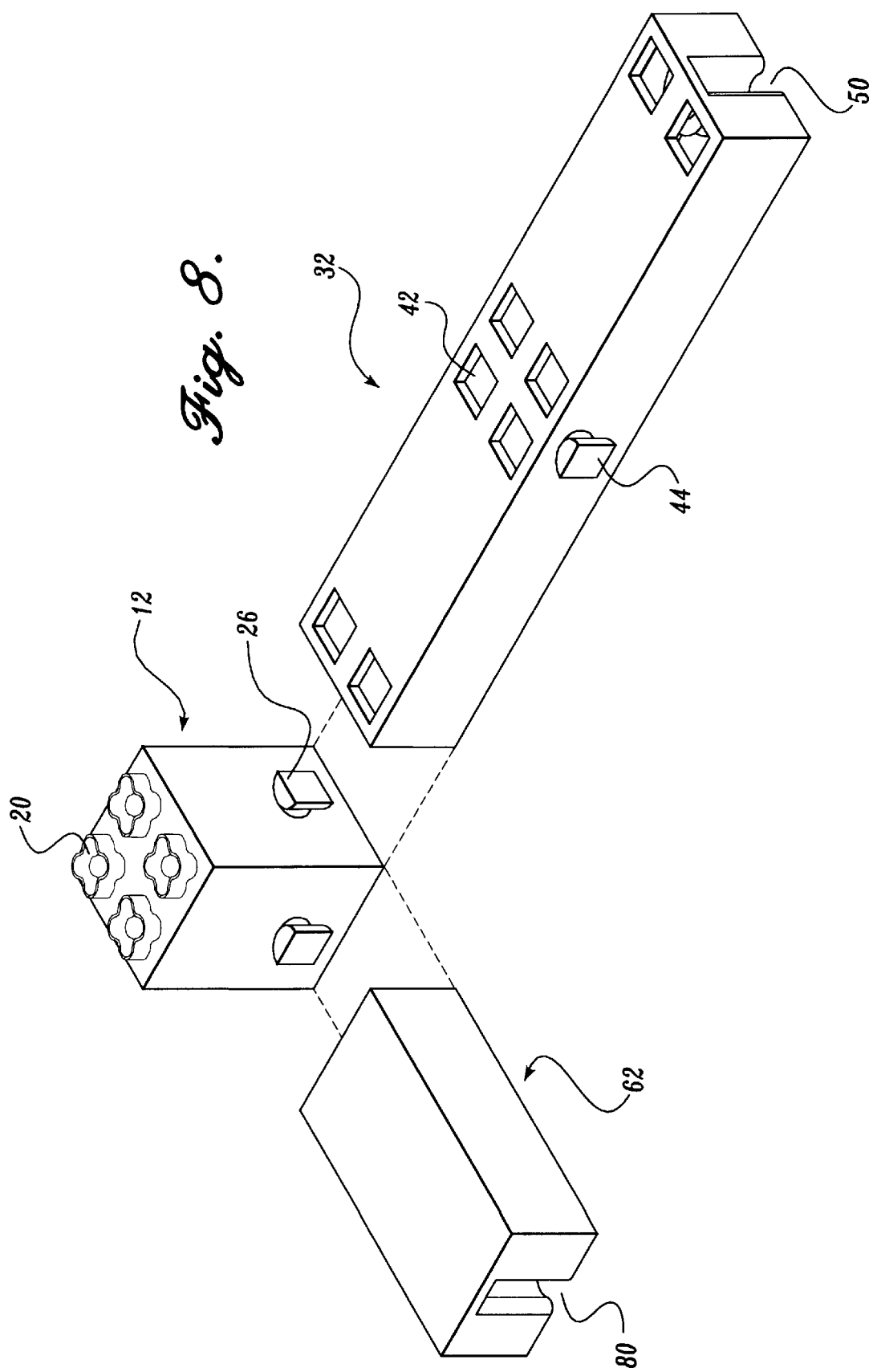
FIG. 8 is an exploded isometric view of the column, beam, and joist of the lattice of the modular toy building set embodying the present invention.
Figure 9:
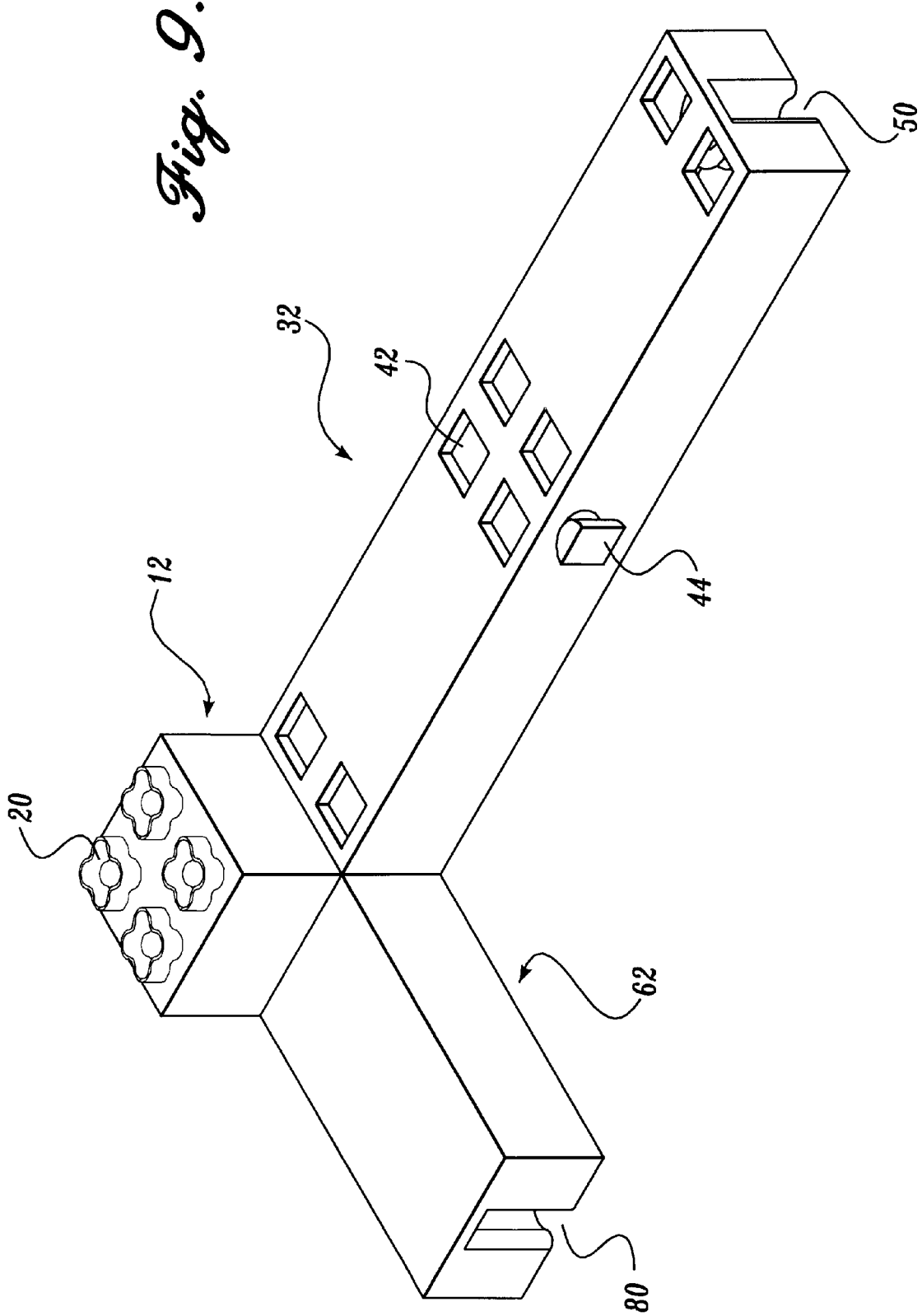
FIG. 9 is an isometric view of the column, beam, and joist of the lattice of the modular toy building set embodying the present invention.

Referring to FIGS. 5, 6, and 7, the interconnection of protrusion connector 26 of column 12 and protrusion connector 44 of beam 32 with slot connector 50 of beam 32 and slot connector 80 of joist 62 is now described in further detail. The interconnection of the above protrusion connectors 26 and 44 with the above slot connectors 50 and 80 is the basis for the removable connection of column 12, beam 32 and joist 62 as shown in FIGS. 8 and 9. In this manner, column 12 can be connected to beam 32 and/or joist 62. Beam 32 can be connected to column 12 and/or joist 62 and joist 62 can be connected to column 12 and/or beam 32. In a first embodiment, head stop 58 of beam 32 and head stop 88 of joist 62 are absent. Head 30 of protrusion connector 26 of column 12 and head 48 of protrusion connector 44 of beam 32 both have a width that is greater than the width of entrance 52 and terminus 56 of slot connector 50 of beam 32 and of entrance 82 and terminus 86 of slot connector 80 of joist 62. However, shaft 28 of protrusion connector 26 of column 12 and shaft 46 of protrusion connector 44 of beam 32 both have a width that is less than the width of entrance 52 and terminus 56 of slot connector 50 of beam 32 and of entrance 82 and terminus 86 of slot connector 80 of joist 62. Based on the above configurations, column 12 can be removably attached to beam 32 or joist 62 and beam 32 can be removably attached to another beam 32 or joist 62 by sliding shaft 28 of protrusion connector 26 of column 12 or shaft 46 of protrusion connector 44 of beam 32 through entrance 52 of slot connector 50 of beam 32 or entrance 82 of slot connector 80 of joist 62 in a direction orthogonal (e.g., upwardly) to the longitudinal axis of beam 32 or joist 62. Because the width of head 30 of protrusion connector 26 of column 12 and of head 48 of protrusion connector 44 of beam 32 is greater than the width of entrance 52 and terminus 56 of slot connector 50 of beam 32 and of entrance 82 and terminus 86 of slot connector 80 of joist 62, the beam 32 or joist 62 cannot be removed from column 12 or other beam 32 or joist 62 by pulling beam 32 or joist 62 along the longitudinal axis thereof.

In another embodiment, head stop 58 of beam 32 and head stop 88 of joist 62 are present. Additionally, as shown in FIG. 5, head 30 of protrusion connector 26 of column 12 and head 48 of protrusion connector 44 of beam 32 both have a length "l" that is greater than the width of entrance 52 and terminus 56 of slot connector 50 of beam 32 and of entrance 82 and terminus 86 of slot connector 80 of joist 62. However, head 30 of protrusion connector 26 of column 12 and head 48 of protrusion connector 44 of beam 32 both have a width "w" less than the width of terminus 56 of slot connector 50 of beam 32 and of terminus 86 of slot connector 80 of joist 62. To removably attach column 12 to beam 32 or joist 62 or to removably attach beam 32 or joist 62 to another beam 32, joist 62 or beam 32 is first axially rotated 90° from the resting configurations shown in FIGS. 5 and 6 such that the width "w" of head 30 of protrusion connector 26 of column 12 or of head 48 of protrusion connector 44 of beam 32 is parallel with the width of entrance 52 and terminus 56 of slot connector 50 of beam 32 or of entrance 82 and terminus 86 of slot connector 80 of joist 62. Head 30 of protrusion connector 26 or head 48 of protrusion connector 44 can thus pass through either entrance 52 and terminus 56 of slot connector 50 or entrance 82 and terminus 86 of slot connector 80. Joist 62 or beam 32 is then rotated 90° back to the resting configuration shown in FIGS. 5 and 6, thus locking column 12 or beam 32 with a beam 32 or a joist 62 since greater length "l" of head 30 of protrusion connector 26 of column 12 or of head 48 of protrusion connector 44 of beam 32 is now parallel with the lesser width of either entrance 52 and terminus 56 of slot connector 50 of beam 32 or entrance 82 and terminus 86 of slot connector 80 of joist 62. Head stop 58 of beam 32 or head stop 88 of joist 62 prevents further rotational movement of head 30 of protrusion connector 26 of column 12 or head 48 of protrusion connector 44 of beam 32.

The above-described modular columns 12, beams 32 and joists 62, having varying heights and lengths, and facilitating both horizontal and vertical interconnection, allow for a multitude of lattice configurations having individual components orthogonally disposed with respect to each other.

Figure 10:
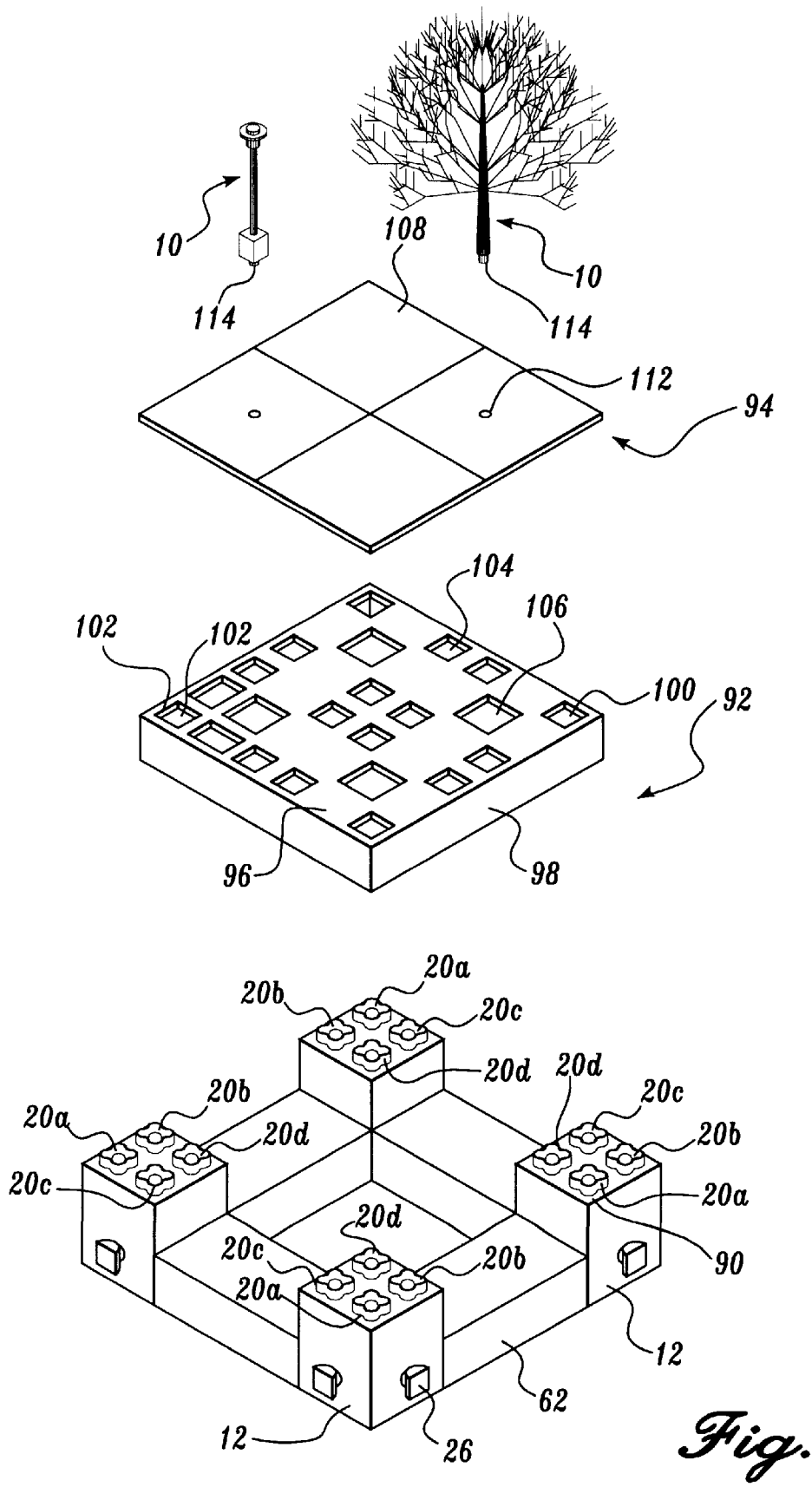
FIG. 10 is an exploded isometric view of the lattice, tile base, tile and playing components of the modular toy building set embodying the present invention.
Figure 11:
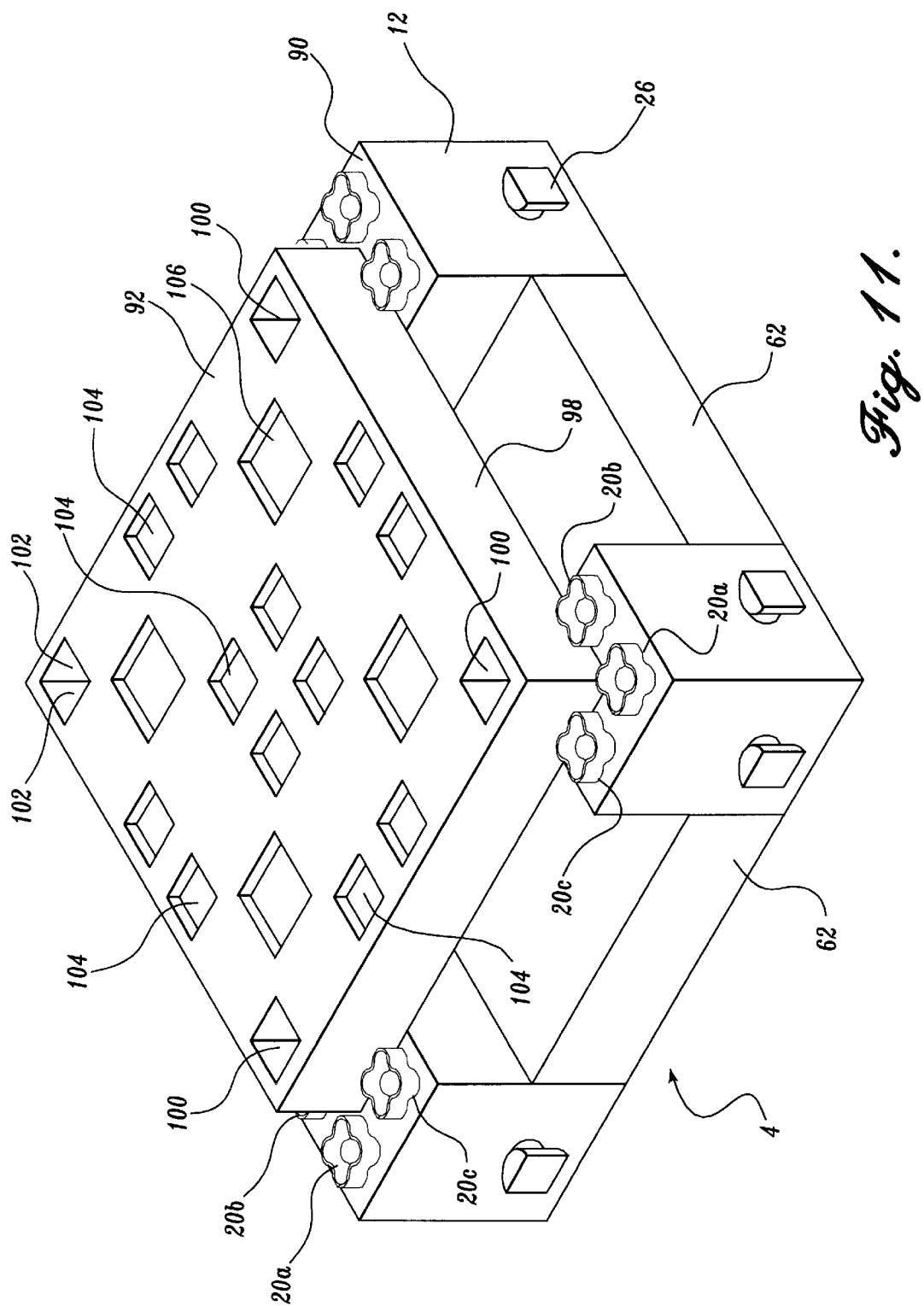
FIG. 11 is an isometric view of the lattice and attached tile base of the modular toy building set embodying the present invention.
Figure 12:
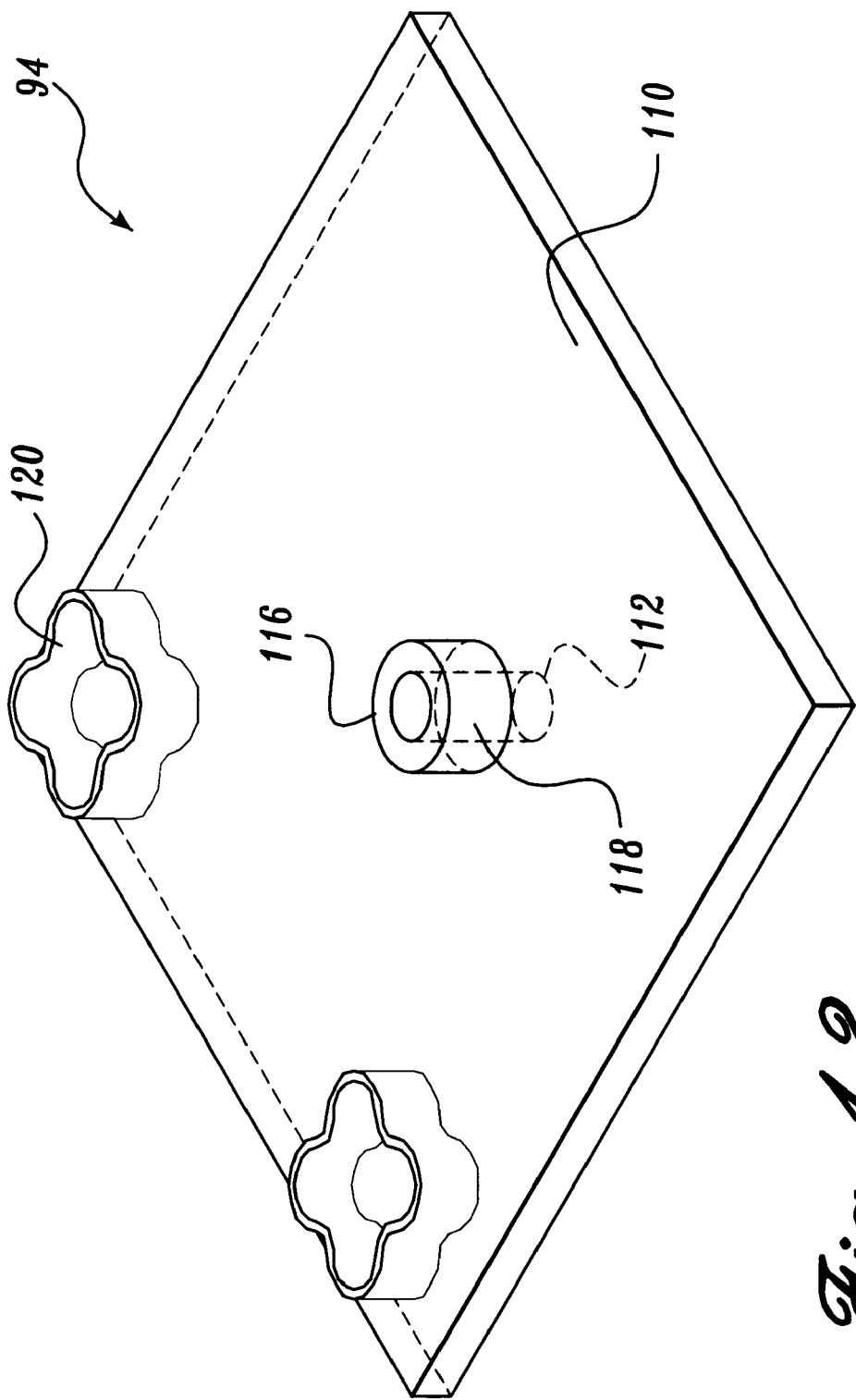
FIG. 12 is an isometric bottom view of the tile of FIG. 10.

Next referring to FIGS. 10–12, base 6 is described in detail. Base 6 is preferably supported on lattice 4, as shown in FIGS. 10 and 11. As previously described, lattice 4 consists of a plurality of columns 12 and orthogonally disposed beams 32 and/or joists 62. While FIGS. 10 and 11 show lattice 4 comprised of only joists 62, lattice 4 can also support base 6 and be comprised of only beams 32 or a combination of beams 32 and joists 62. In these other embodiments, base 6 of different sizes than shown are employed to removably attach to lattice 4. More specifically, if lattice 4 is comprised of four beams 32, base 6 in that embodiment would be both longer and wider than base 6 as shown in FIGS. 10 and 11 due to the greater length of beams 32 as compared to joists 62. Likewise, if lattice 4 is comprised of two beams 32 and two joists 62, base 6 of that embodiment would be elongate relative to base 6 of FIGS. 10 and 11 due to the greater length of beams 32 relative to joists 62. Each column 12 of lattice 4 has an attachment node 90 thereon. Each attachment node 90 has a plurality of attachment fittings thereon, the attachment fittings preferably being four in number and being male fittings 20a, b, c, and d. Each attachment node 90 is preferably located on top 16 of column 12 and the attachment nodes 90 are spaced apart to support base 6 as further described below. Male fittings 20a, b, c, and d on each attachment node 90 are preferably clover leaf in shape, but may be of any shape sized to removably attach to complementary female fittings on base 6 further described below. Additionally, while male fittings 20a, b, c, and d are shown on attachment nodes 90 and complementary female fittings are shown on base 6, it is understood that at this assembly point of the invention, and all other assembly points disclosed herein, male fittings and female fittings can be switched to be on opposite components.

Base 6 is preferably comprised of tile base 92, a first planar member, which is removably attachable to tile 94, a second planar member. Tile base 92 is preferably a parallelogram having a top 96 and exterior edges 98. Adjacent the four corners of tile base 92 are channels 100. Channels 100 have interior walls 102 orthogonal to top 96 of tile base 92. Thus, the portion of channels 100 under tile base 92 defined by the lower portion of edges 98 and interior walls 102 create a female fitting matable with male fitting 20d on attachment node 90 of lattice 4. The ends of channels 100 of tile base 92 located adjacent top 96 of tile base 92 define female fittings that are sized to interference fit with attachment fittings on tile 94, further described below. Channels 100 are preferably square in cross section. Tile base 92 also can have a plurality of additional female fittings 104, also preferably square, in top 96 sized and oriented to removably interference fit with male fittings on tile 94, discussed further below. Collar orifices 106 are also located in top 96 of tile base 92. Collar orifices 106 are oriented and sized to retain protrusions, or collars, present on the underside of tile 94, described further below.

Innermost male fittings 20d that are closest to the center of lattice 4 removably interference fit with interior walls 102 that bound channels 100 on the underside of tile base 92. As specifically shown in FIG. 11, tile base 92 is thus preferably sized such that additional tile bases 92 are removably attachable to the non-innermost of male fittings, male fittings 20a, 20b, and 20c of attachment nodes 90. In this manner, planar member 92 is attachable to the central portion of lattice 4 and preferably eight additional tile bases 92 can be attached to the periphery of lattice 4 at male fittings 20a, 20b, and 20c. More specifically, two additional tile bases 92 can each attach to two male fittings 20b, one each on opposite sides of lattice 4. Two tile bases can attach to male fittings 20c, one each on opposite sides of lattice 4 that are perpendicular to the sides of lattice 4 supporting the additional tile bases 92 mating with male fittings 20b. Four additional tile bases 92 can each attach to one of male fittings 20a, such that one tile base 92 attaches to each of the four attachment nodes 90 of lattice 4. These peripherally attached tile bases 92 are preferably also supported by other lattices 4 interconnected with lattice 4 shown in FIGS. 10 and 11.

Next referring to FIGS. 10 and 12, tile 94 is preferably a planar member having a top 108, and a bottom 110. Tile 94 can have one or more playing component openings 112 matable with playing component protrusions 114 on playing components 10. Playing component openings 112 preferably pass entirely through tile 94. Collar 116 having collar opening 118 is preferably located on bottom 110 of tile 94. Collar opening 118 is coaxially aligned with playing component opening 112 that preferably passes entirely through tile 94. In this manner, playing component protrusion 114 of playing component 10 can be braced within collar 116 for added stability. Collar 116 is oriented on bottom 110 of tile 94 to reside within one of collar orifices 106 on top 96 of tile base 92 for a low profile fit between tile base 92 and tile 94. Male fittings 120 are located on bottom 110 of tile 94. Male fittings 120 are preferably clover leaf in shape and are sized to removably interference fit with the upper portion of channels 100 adjacent top 96 that define female fittings located at the corners of tile base 92. Male fittings 120 of tile 94 also removably interface fit with female fittings 104 on top 96 of tile base 92 for removable attachment of tile base 92 and tile 94. Tile 94 can cover all of top 96 of tile base 92 when tile 94 is to portray a section of grass, earth, water, or pavement that has a unitary depth. However, when a varied depth is desired, such as when a road, street, river bank, or lake shore is being portrayed, as shown in FIG. 1, tile 94 can cover only a portion of tile base 92 such that tile 94 can portray a sidewalk, green belt, river bank, or lake edge having a height greater than the street, road, river, or lake depicted by the exposed portion of tile base 92.

Next referring to FIGS. 13–16, modular buildings 122 are described in detail. Modular buildings 122 are removably attachable to tile base 92, as shown in FIGS. 1 and 2 and as described in further detail below. As shown in FIGS. 13–16, modular buildings 122 are comprised of foundations 124, wall members 126 and couplers 128. Foundations 124 are preferably substantially planar members having a top 130, a bottom 132 and edges 134. Each foundation 124 has a raised rib 136 on top 130. Preferably, four raised ribs 136 are present and are disposed substantially perpendicularly to one another in a substantially cross-shaped configuration. Preferably, the cross-shaped configuration of raised ribs 136 divides top 130 of foundation 124 into quadrants 130*a*, 130*b*, 130*c* and 130*d*. Each raised rib 136 preferably has beveled edges 138 that extend outward from top 130 of foundation 124 such that top 140 of raised rib 136 has a greater surface area than does the underside of raised rib 136 that is in contact with top 130 of foundation 124.

Figure 17:
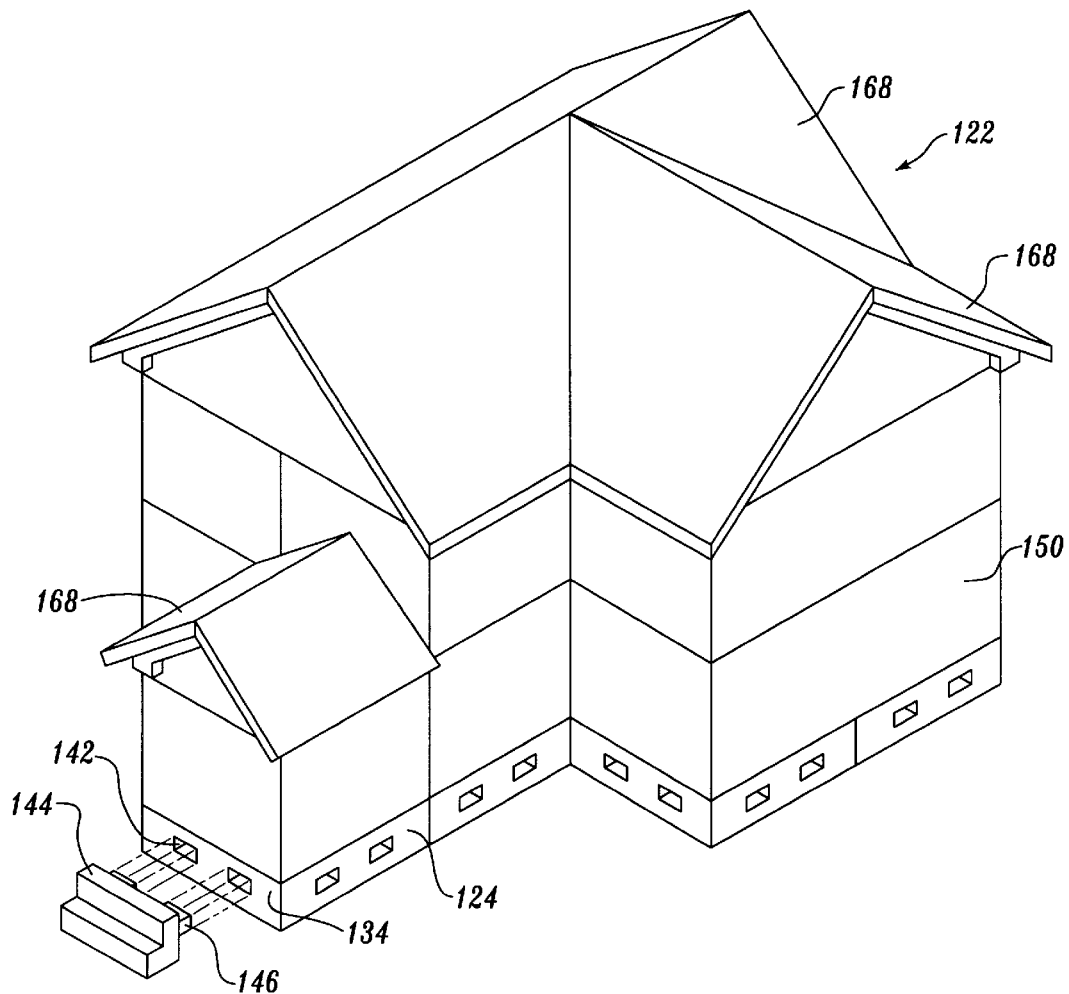
FIG. 17 is an isometric view of a two-story modular building of the modular toy building set embodying the present invention.

Female fittings 142 are located on edges 134 of foundation 124. Female fittings 142 can be male fittings as long as the component to be attached to edges 134 of foundation 124 has complementary fittings thereon. Likewise, where female (or male) fittings are described herein, the complementary fitting, (male) or (female) can be employed instead as long as a mating fitting is present on the component to which the described structure is to be attached. As shown in FIG. 17, building subassembly 144 which can be, for example, steps, has male fittings 146 thereon that are matable with female fittings 142 of edges 134 of foundation 124 for attachment of building subassembly 144 to foundation 124.

Figure 15:
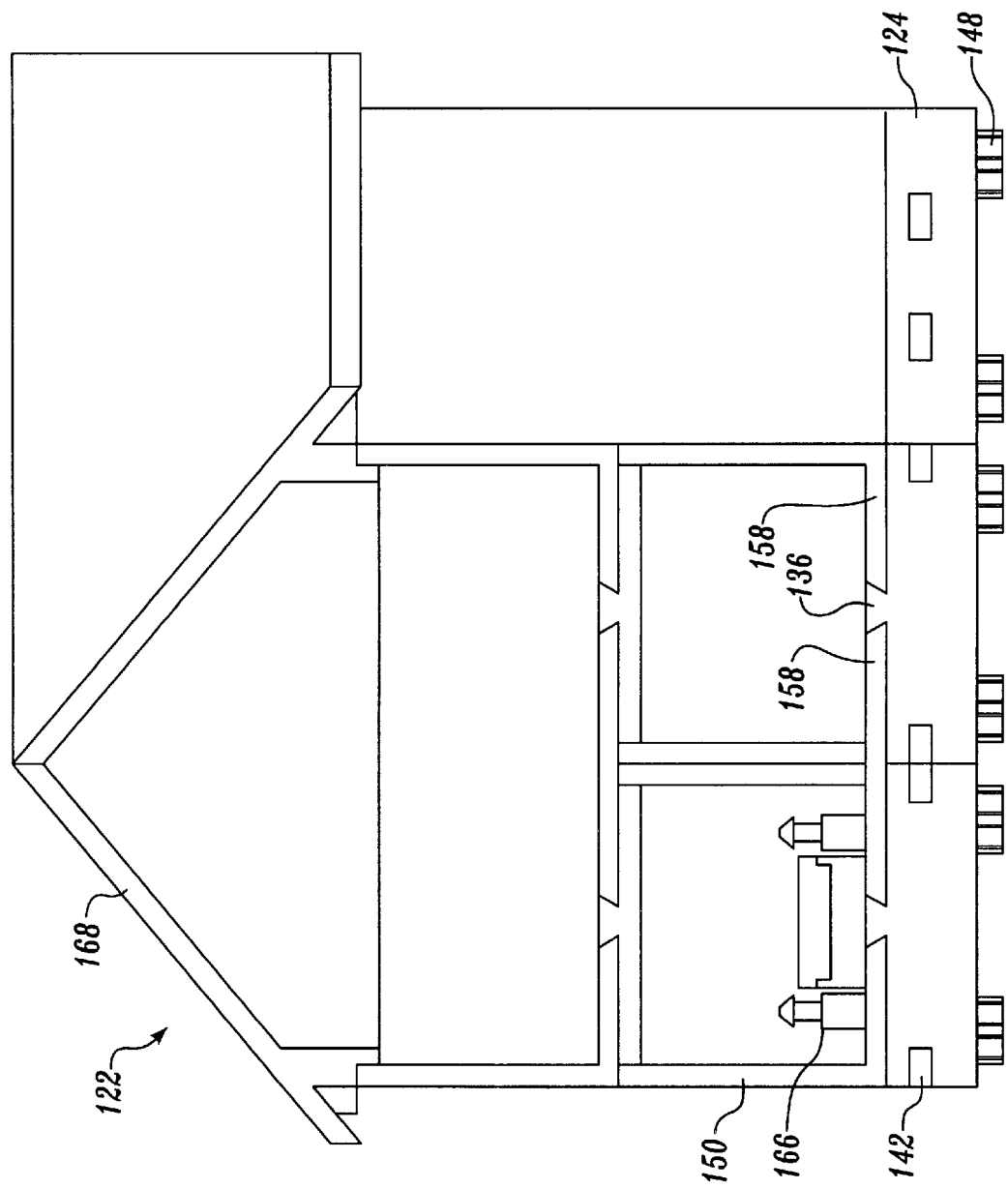
FIG. 15 is a partially exposed view of a modular building of the modular toy building set embodying the present invention.

Bottom 132 of foundation 124 has a plurality of male fittings 148 thereon, as shown in FIG. 15. Male fittings 148 are preferably clover leaf in shape and are sized and aligned to fit in the portion of channel 100 adjacent top 96 of tile base 92 and in female fittings 104 of tile base 92 to removably attach foundation 124, and modular building 122, to tile base 92.

Figure 13:
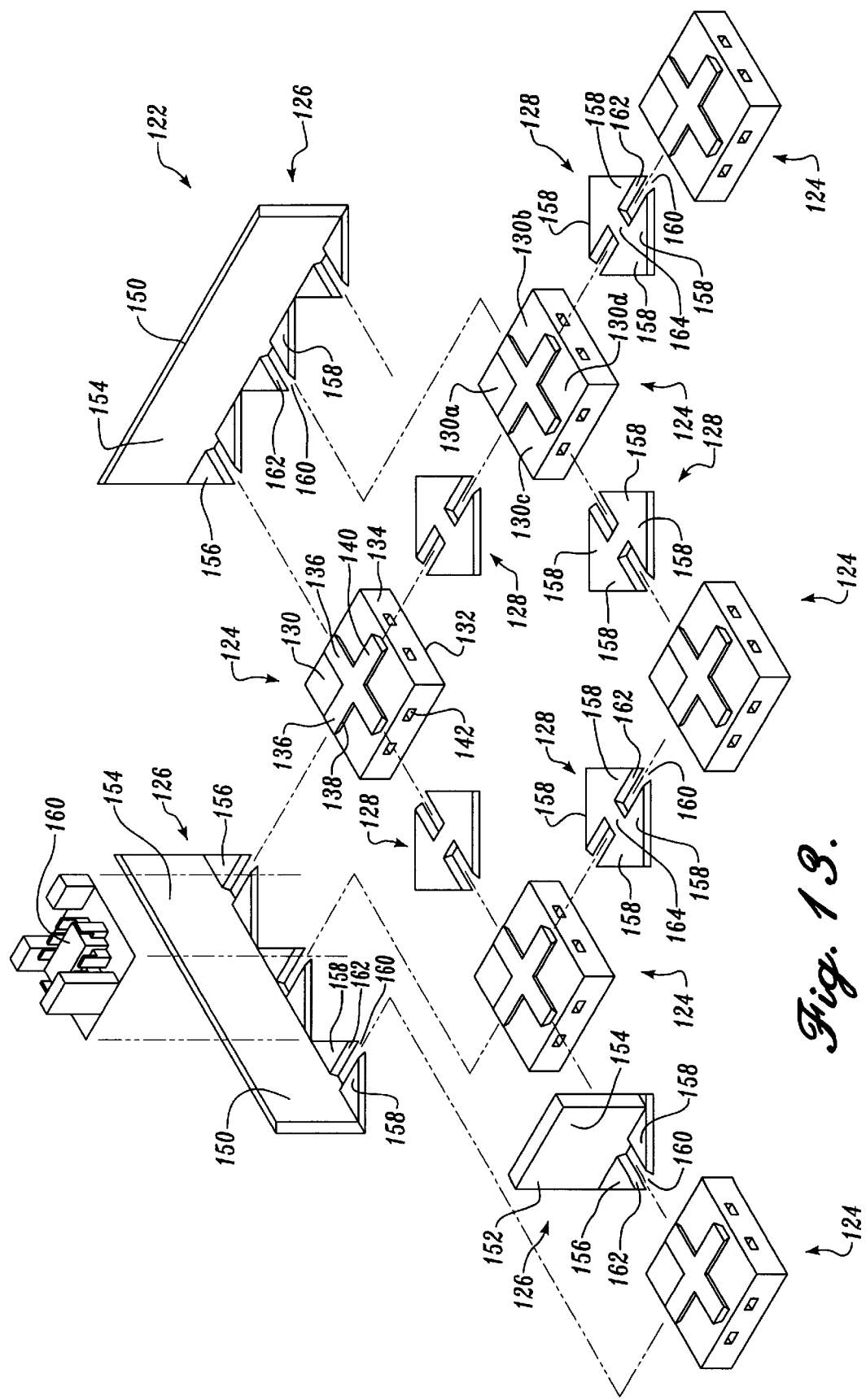
FIG. 13 is an exploded isometric view of a modular building of the modular toy building set embodying the present invention.
Figure 14:
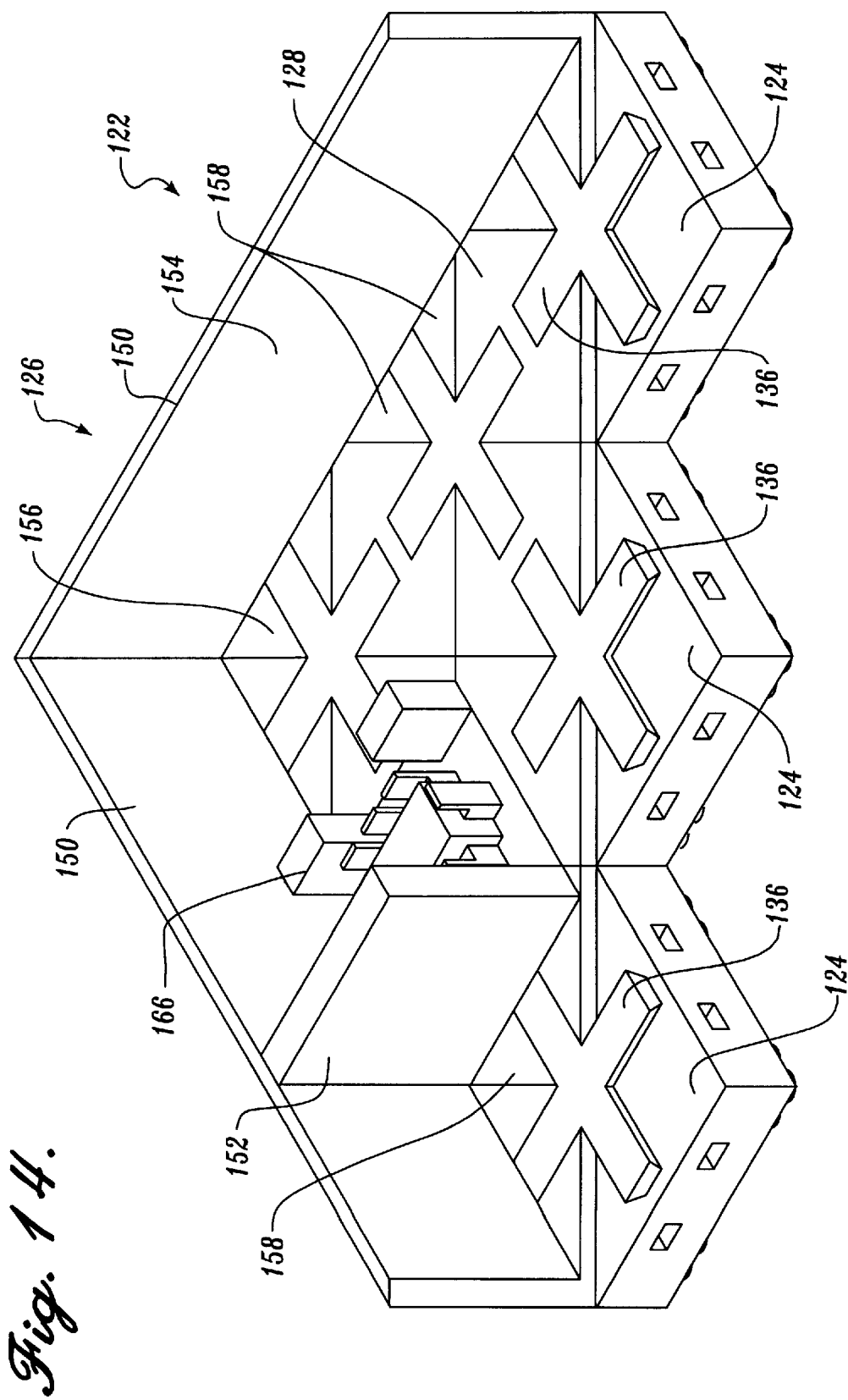
FIG. 14 is an isometric view of a modular building of the modular toy building set embodying the present invention.

Referring to FIGS. 13 and 14, wall members 126 can either be exterior wall members 150 or interior wall members 152. Exterior wall members 150 form the external perimeter of modular building 122 while interior wall members 152 divide modular building 122 into cubicles or rooms, and can have doors or other openings therein. Wall members 126 are comprised of a wall portion 154 that is substantially orthogonally disposed to foundation 124, and a base portion 156 which is substantially parallel to foundation 124 when wall member 126 is attached to foundation 124. Exterior wall members 150 have base portions 156 located on only one side of wall portion 154 while interior wall members 152 have base portions 156 located on both sides of wall portion 154. Each base portion 156 is comprised of a pair of wings 158 that are preferably triangular in shape and are separated by a cleft 160. The edge 162 of each wing 158 bordering cleft 160 is beveled at an angle complementary to the angle of beveled edges 138 of raised ribs 136 of foundation 124.

Similarly, each coupler 128, which is employed to join two foundations 124 without a wall separating the two foundations 124, also includes cleft 160 separating wings 158. More specifically, each coupler 128 includes two pair of wings 158, with one pair of wings 158 joined to the other pair of wings 158 by spine 164. Each pair of wings 158 is spaced by a cleft 160. Each of wings 158 have edges 162 adjacent cleft 160 that are beveled at an angle complementary to beveled edges 138 of raised rib 136 of foundation 124.

To removably interconnect a plurality of foundations 124, wall members 126 and couplers 128, raised ribs 136 of foundations 124 are slid into clefts 160 of base portions 156 of wall members 126 or into clefts 160 of couplers 128. As best shown in FIGS. 13 and 14, each wing 158 of a coupler 128 or of a base portion 156 of a wall member 126 will occupy one half of one of quadrants 130*a*, 130*b*, 130*c*, or 130*d* of top 130 of foundation 124. Thus, adjacent wings 158 of adjacent couplers 128 or adjacent base portions 156 of wall members 126 can abut to seamlessly and completely occupy one of quadrants 130*a*, 130*b*, 130*c*, or 130*d* of top 130 of foundation 124. Because, the height of wings 158 of couplers 128 and of base portions 156 of wall members 126 are preferably equivalent to the height of raised ribs 136 of foundations 124, a common surface is formed over top 130 of foundation 124 by attachment of foundations 124 with wall members 126 and couplers 128. Modular furnishings 166 can be then placed on top of the seamless surface formed by wings 158 and raised ribs 136 over top 130 of foundation 124.

Figure 16:
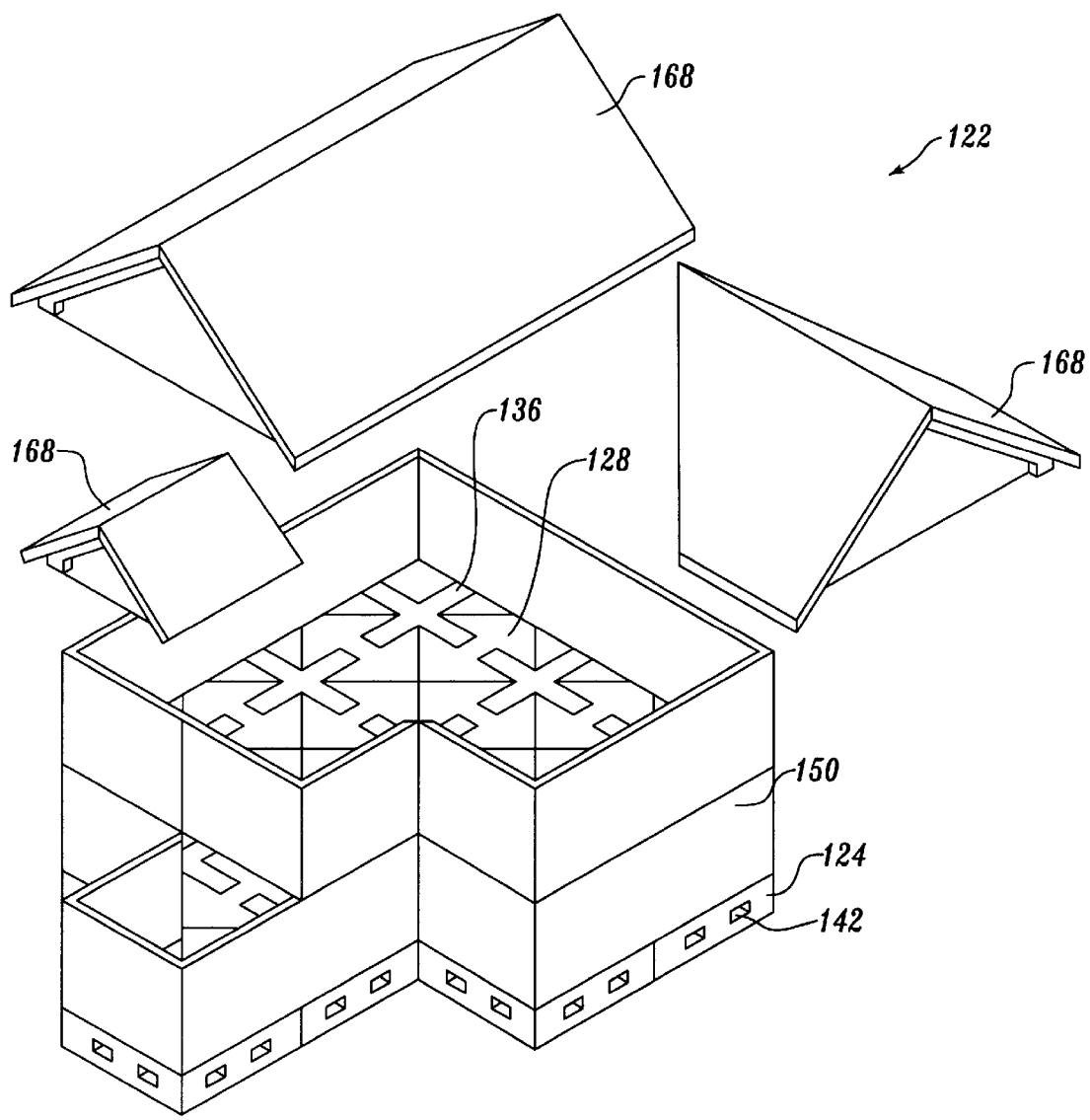
FIG. 16 is an exploded isometric view of a two-story modular building of the modular toy building set embodying the present invention.

As shown in FIG. 16, adjacent exterior wall members 150 can be aligned such that the exterior walls thereof form a 90° angle, 180° angle, or a 270° angle. As shown in FIGS. 15–17, additional floors or stories can be added to a first floor of modular building 122, topped by roof units 168 sized and shaped to cover modular building 122. It is readily apparent from the above description that modular buildings 122 of various shapes, sizes and configurations can be formed employing a plurality of the above modular components including foundations 124, wall members 126, couplers 128, building subassemblies 144, modular furnishings 166, and roof units 168.

Next referring to FIGS. 1, 2, 4A, 4B and 18 through 38, modular terrain pieces 8 are shown. Specifically referring to FIGS. 4A, 4B and 18, each modular terrain piece 8 has a top 170, a bottom 172 and edges 174. As shown in FIG. 18, interior walls 176 orthogonally abut the interior sides of edges 174 and bottom 172 of modular terrain pieces 8 to form female fittings 178 that are preferably square channels. As shown in FIGS. 4A and 4B, female fittings 178 are removably attachable to one of male fittings 20*a*, 20*b*, 20*c* or 20*d* of attachment node 90 of lattice 4.

Modular terrain pieces 8 shown in FIGS. 19 through 38 each have a unique topography. However, modular terrain pieces 8 all have common structural features that provide the modular nature such that a multitude of different topographies can be formed with the finite geometric configurations of modular terrain pieces 8 shown in FIGS. 19 through 38. More specifically, each modular terrain piece 8 has a plurality of exterior edges having spaced longitudinal end points. All of modular terrain pieces 8 shown in FIGS. 19 through 38 have exterior edges comprised of one or more of the three types of exterior edge configurations: flat exterior edges F, hill exterior edges H and slope exterior edges S. Employing the modular terrain pieces 8 of the present invention, two adjacent modular terrain pieces 8 can only be abutted on lattice 4 at their common exterior edges if these edges are of the same configuration. For example, a flat exterior edge F on a first modular terrain piece 8 can only be abutted to another flat exterior edge F on an adjacent modular terrain piece 8. Likewise, a hill exterior edge H on a modular terrain piece 8 can only be abutted to another hill exterior edge H on another modular terrain piece 8. Also, a slope exterior edge S on a modular terrain piece 8 can only be abutted to another slope exterior edge S on an adjacent modular terrain piece 8.

Referring to FIGS. 4A, 4B and 18 through 38, flat exterior edges F have no change in height Δh between the spaced longitudinal end points thereof. The distance between the spaced longitudinal end points of flat exterior edge F is one of Y, √2Y and 2√2Y. The flat exterior edges F disposed parallel or perpendicular to beams 32 and joists 62 of lattice 4 and spanning two attachment nodes 90 of lattice 4 have a distance between their spaced longitudinal end points of Y. The flat exterior edges F diagonally disposed to beams 32 and joists 62 of lattice 4 and spanning two attachment nodes 90 of lattice 4 have a distance between their spaced longitudinal end points of √2Y. The flat exterior edges F diagonally disposed to beams 32 and joists 62 of lattice 4 and spanning three attachment nodes 90 have a distance between their spaced longitudinal end points of 2√2Y. Note that while flat exterior edges F can be disposed parallel or perpendicular to beams 32 and joists 62 of lattice 4, as can hill exterior edges H and slope exterior edges S as described in further detail below, the flat exterior edges F are the only exterior edges configurable diagonally to beams 32 and joists 62 of lattice 4.

Unlike flat exterior edges F, which have no change in height Δh between the spaced longitudinal end points thereof, hill exterior edges H have a change in height Δh between their spaced longitudinal end points of X, being equal to the height of column 12, as shown in FIGS. 4A, 4B, and 18 through 38. The distance between these spaced longitudinal end points of hill exterior edges H is Y, being equal to the combined length of a joist 62 and column 12.

Still referring to FIGS. 4A, 4B and 18 through 38, the slope exterior edges S of modular terrain pieces 8 have a change in height Δh between the spaced longitudinal end points thereof of X, as does the hill exterior edge H referred to above. However, the distance between the spaced longitudinal end points of slope exterior edge S is 2Y, twice the distance between the spaced longitudinal end points of hill exterior edge H, or the combined length of a column 12 and a beam 32.

As shown in FIGS. 19 through 38, modular terrain pieces 8 can have preferably from three to five exterior edges, with at least two of these exterior edges preferably being different ones of flat exterior edges F, hill exterior edges H and slope exterior edges S. For example, modular terrain pieces 8 of FIGS. 19 through 23 are comprised of a combination of flat exterior edges F and hill exterior edges H. However, modular terrain pieces 8 of FIGS. 24 through 30 are comprised of a combination of flat exterior edges F and slope exterior edges S. In contrast, modular terrain pieces 8 of FIGS. 31 through 38 are comprised of a combination of flat exterior edges F, hill exterior edges 4 and slope exterior edges S.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A modular terrain for a toy building set comprising:
   a lattice frame having orthogonal elongate lattice members, corners located at the ends of said lattice members and protrusion connectors extending from each corner;
   a plurality of terrain pieces, a first group of said terrain pieces having a flat exterior edge, said flat exterior edge only matable with a flat exterior edge on another of said terrain pieces, said flat exterior edge having spaced longitudinal end points, said flat exterior edge having no change in height between said spaced longitudinal end points and a length defined by the distance between said spaced longitudinal end points of said flat exterior edge, said length being one of Y, √2Y and 2√2Y; and
   a second group of said terrain pieces having a slope exterior edge, said slope exterior edge only matable with a slope exterior edge on another of said terrain pieces, said slope exterior edge having end points spaced in both a longitudinal and vertical direction, said slope exterior edge having a change in height defined by the vertical distance between said spaced longitudinal end points, said change in height being X, said sloped exterior edge further comprising a length defined by the longitudinal distance between said end points, said length of said slope exterior edge being 2Y, wherein said plurality of terrain pieces being removably attachable to said protrusion connectors.

2. The modular terrain of claim 1, wherein:
   a third group of said terrain pieces have a hill exterior edge, said hill exterior edge only matable with a hill exterior edge on another of said terrain pieces, said hill exterior edge having end points spaced in both a longitudinal and vertical direction, said hill exterior edge having a change in height defined by the vertical distance between said spaced longitudinal end points, said change in height being X, said hill exterior edge further comprising a length defined by the longitudinal distance between said end points, said length of said hill exterior edge being Y.

3. The modular terrain of claim 2, wherein at least one of said terrain pieces is a member of both said first group and said third group.

4. The modular terrain of claim 2, wherein at least one of said terrain pieces is a member of said second group and said third group.

5. The modular terrain of claim 2, wherein at least one of said terrain pieces is a member of said first group, said second group and said third group.

6. The modular terrain of claim 1, wherein at least one of said terrain pieces is a member of said first group and said second group.

7. The modular terrain of claim 1, wherein:
   said terrain pieces have a bottom, said bottom having attachment fittings thereon removably attachable to said protrusion connectors on said frame.

8. The modular terrain of claim 1, wherein:
   said slope exterior edges being disposed parallel or perpendicular to all of the elongate lattice members, and said flat exterior edges being the only exterior edges configurable diagonally to the elongate lattice members.

9. The modular terrain of claim 8, wherein:
   said flat exterior edges being diagonally disposed to the elongate lattice members and spanning two protrusion connectors have a distance between said spaced longitudinal end points of √2Y.

10. The modular terrain of claim 8, wherein:
    said flat exterior edges being diagonally disposed to the elongate lattice members and spanning three protrusion connectors have a distance between said spaced longitudinal ends of 2√2Y.

11. The modular terrain of claim 8, wherein:
    said flat exterior edges being disposed parallel or perpendicular to the elongate lattice members and spanning two protrusion connectors have a distance between said spaced longitudinal ends of Y.

12. A modular terrain for a toy building set comprising:

a lattice frame having orthogonal elongate lattice members, corners located at the ends of said lattice members and protrusion connectors extending from each corner;

a plurality of terrain pieces, a first group of said terrain pieces having a hill exterior edge, said hill exterior edge only matable with a hill exterior edge on another of said terrain pieces, said hill exterior edge having end points spaced in both a longitudinal and vertical direction, said hill exterior edge having a change in height defined by the vertical distance between said spaced longitudinal end points, said change in height being X, said hill exterior edge further comprising a length defined by the longitudinal distance between said end points, said length of said hill exterior edge being Y; and a second group of said terrain pieces having a slope exterior edge, said slope exterior edge only matable with a slope exterior edge on another of said terrain pieces, said slope exterior edge having end points spaced in both a longitudinal and vertical direction, said slope exterior edge having a change in height defined by the vertical distance between said spaced longitudinal end points, said change in height being X, said sloped exterior edge further comprising a length defined by the longitudinal distance between said end points, said length of said slope exterior edge being 2Y, wherein said plurality of terrain pieces being removably attachable to said protrusion connectors.

13. The modular terrain of claim 12, wherein:

a third group of said terrain pieces having a flat exterior edge, said flat exterior edge only matable with a flat exterior edge on another of said terrain pieces, said flat exterior edge having spaced longitudinal end points, said flat exterior edge having no change in height between said spaced longitudinal end points and a length defined by the distance between said spaced longitudinal end points of said flat exterior edge, said length being one of Y, $\sqrt{2}Y$ and $2\sqrt{2}Y$.

14. The modular terrain of claim 12, wherein at least one of said terrain pieces is a member of both said first group and said third group.

15. The modular terrain of claim 12, wherein at least one of said terrain pieces is a member of said second group and said third group.

16. The modular terrain of claim 12, wherein at least one of said terrain pieces is a member of said first group, said second group and said third group.

17. The modular terrain of claim 12, wherein at least one of said terrain pieces is a member of said first group and said second group.

18. The modular terrain of claim 13, wherein:

said slope and said hill exterior edges being disposed parallel or perpendicular to all of the elongate lattice members, and said flat exterior edges being the only exterior edges configurable diagonally to the elongate lattice members.

19. The modular terrain of claim 12, wherein:

said terrain pieces have a bottom, said bottom having attachment fittings thereon removably attachable to said protrusion connectors on said frame.

20. A modular terrain for a toy building set comprising:

a lattice frame having orthogonal elongate lattice members, corners located at the ends of said lattice members and protrusion connectors extending from each corner;

a plurality of terrain pieces, a first group of said terrain pieces having a flat exterior edge, said flat exterior edge only matable with a flat exterior edge on another of said terrain pieces, said flat exterior edge having spaced longitudinal end points, said flat exterior edge having no change in height between said spaced longitudinal end points and a length defined by the distance between said spaced longitudinal end points of said flat exterior edge, said length being one of Y, $\sqrt{2}Y$ and $2\sqrt{2}Y$; and a second group of said terrain pieces having a hill exterior edge, said hill exterior edge only matable with a hill exterior edge on another of said terrain pieces, said hill exterior edge having end points spaced in both a longitudinal and vertical direction, said hill exterior edge having a change in height defined by the vertical distance between said spaced longitudinal end points, said change in height being X, said hill exterior edge further comprising a length defined by the distance between said spaced longitudinal end points, said length of said hill exterior edge being Y, wherein said plurality of terrain pieces being removably attachable to said protrusion connectors.

21. The modular terrain of claim 20, wherein:

a third group of said terrain pieces have a slope exterior edge, said slope exterior edge only matable with a slope exterior edge on another of said terrain pieces, said slope exterior edge having spaced longitudinal end points, said slope exterior edge having, a change in height between said spaced longitudinal end points of X, the distance between said spaced longitudinal end points of said slope exterior edge being 2Y.

22. The modular terrain of claim 21, wherein at least one of said terrain pieces is a member of both said first group and said third group.

23. The modular terrain of claim 21, wherein at least one of said terrain pieces is a member of said second group and said third group.

24. The modular terrain of claim 21, wherein at least one of said terrain pieces is a member of said first group, said second group and said third group.

25. The modular terrain of claim 20, wherein at least one of said terrain pieces is a member of said first group and said second group.

26. The modular terrain of claim 20, wherein:

said terrain pieces have a bottom, said bottom having attachment fittings thereon removably attachable to said protrusion connectors on said frame.

27. The modular terrain of claim 20, wherein:

said hill exterior edges being disposed parallel or perpendicular to all of the elongate lattice members, and said flat exterior edges being the only exterior edges configurable diagonally to the elongate lattice members.

28. The modular terrain of claim 27, wherein:

said flat exterior edges being diagonally disposed to the elongate lattice members and spanning two protrusion connectors have a distance between said spaced longitudinal end points of $\sqrt{2}Y$.

29. The modular terrain of claim 27, wherein:

said flat exterior edges being diagonally disposed to the elongate lattice members and spanning three protrusion connectors have a distance between said spaced longitudinal ends of $2\sqrt{2}Y$.

30. A modular terrain of claim 27, wherein:

said flat exterior edges being disposed parallel or perpendicular to the elongate lattice members and spanning two protrusion connectors have a distance between said spaced longitudinal ends of Y.

31. A modular terrain for a toy building set comprising:
- a lattice frame having orthogonal elongate lattice members, corners located at the ends of said lattice members and protrusion connectors extending from each corner;
- a plurality of terrain pieces, a first group of said terrain pieces having a flat exterior edge, said flat exterior edge only matable with a flat exterior edge on another of said terrain pieces, said flat exterior edge having spaced longitudinal end points, said flat exterior edge having no change in height between said spaced longitudinal end points and a length defined by the distance between said spaced longitudinal end points of said flat exterior edge, said length being one of Y, $\sqrt{2}Y$ and $2\sqrt{2}Y$;
- a second group of said terrain pieces having a hill exterior edge, said hill exterior edge only matable with a hill exterior edge on another of said terrain pieces, said hill exterior edge having end points spaced in both a longitudinal and vertical direction, said hill exterior edge having a change in height defined by the vertical distance between said spaced longitudinal end points, said change in height being X, said hill exterior edge further comprising a length defined by the longitudinal distance between said end points, said length of said hill exterior edge being Y; and
- a third group of said terrain pieces having a slope exterior edge, said slope exterior edge only matable with a slope exterior edge on another of said terrain pieces, said slope exterior edge having end points spaced in both a longitudinal and vertical direction, said slope exterior edge having a change in height defined by the vertical distance between said spaced longitudinal end points, said change in height being X, said sloped exterior edge further comprising a length defined by the longitudinal distance between said end points, said length of said slope exterior edge being 2Y, wherein said plurality of terrain pieces being removably attachable to said protrusion connectors.

32. The modular terrain of claim 31, wherein at least one of said terrain pieces is a member of both said first group and said third group.

33. The modular terrain of claim 31, wherein at least one of said terrain pieces is a member of said second group and said third group.

34. The modular terrain of claim 31, wherein at least one of said terrain pieces is a member of said first group, said second group and said third group.

35. The modular terrain of claim 31, wherein at least one of said terrain pieces is a member of said first group and said second group.

36. The modular terrain of claim 31, wherein:
said terrain pieces have a bottom, said bottom having attachment fittings thereon removably attachable to said protrusion connectors on said frame.

37. The modular terrain of claim 31, wherein:
said slope and said hill exterior edges being disposed parallel or perpendicular to all of the elongate lattice members, and said flat exterior edges being the only exterior edges configurable diagonally to the elongate lattice members.

38. The modular terrain of claim 37, wherein:
said flat exterior edges being diagonally disposed to the elongate lattice members and spanning two protrusion connectors have a distance between said spaced longitudinal end points of $\sqrt{2}Y$.

39. The modular terrain of claim 37, wherein:
said flat exterior edges being diagonally disposed to the elongate lattice members and spanning two protrusion connectors have a distance between said spaced longitudinal ends of $2\sqrt{2}Y$.

40. A modular terrain of claim 37, wherein:
said flat exterior edges being disposed parallel or perpendicular to the elongate lattice members and spanning two protrusion connectors have a distance between said spaced longitudinal ends of Y.

* * * * *